(12) United States Patent
Touma

(10) Patent No.: US 10,189,097 B2
(45) Date of Patent: Jan. 29, 2019

(54) INSERT AND INDEXABLE ROTARY CUTTING TOOL

(71) Applicant: Mitsubishi Hitachi Tool Engineering, Ltd., Tokyo (JP)

(72) Inventor: Syoujirou Touma, Narita (JP)

(73) Assignee: Mitsubishi Hitachi Tool Engineering, Ltd., Tokyo (JP)

( * ) Notice: Subject to any disclaimer, the term of this patent is extended or adjusted under 35 U.S.C. 154(b) by 218 days.

(21) Appl. No.: 15/113,106

(22) PCT Filed: Jan. 26, 2015

(86) PCT No.: PCT/JP2015/052066
§ 371 (c)(1),
(2) Date: Jul. 21, 2016

(87) PCT Pub. No.: WO2015/115379
PCT Pub. Date: Aug. 6, 2015

(65) Prior Publication Data
US 2017/0008099 A1    Jan. 12, 2017

(30) Foreign Application Priority Data

Jan. 28, 2014 (JP) .................................. 2014-013424
Aug. 26, 2014 (JP) .................................. 2014-171909

(51) Int. Cl.
  *B23C 5/20* (2006.01)
  *B23C 5/10* (2006.01)
(52) U.S. Cl.
  CPC .............. *B23C 5/207* (2013.01); *B23C 5/109* (2013.01); *B23C 2200/0438* (2013.01);
  (Continued)

(58) Field of Classification Search
  CPC . B23C 5/207; B23C 5/109; B23C 2200/0438; B23C 2200/0494;
  (Continued)

(56) References Cited

U.S. PATENT DOCUMENTS 5,007,775 A  4/1991  Pantzar
6,142,716 A  11/2000 Jordberg et al.
(Continued)

FOREIGN PATENT DOCUMENTS

CN        1315892 A    10/2001
CN      102886551 A     1/2013
(Continued)

OTHER PUBLICATIONS

International Search Report of PCT/JP2015/052066 dated Mar. 17, 2015.
(Continued)

*Primary Examiner* — Alan Snyder
(74) *Attorney, Agent, or Firm* — Sughrue Mion, PLLC

(57) ABSTRACT

A substantially parallelogramatic insert having a downward inclined main cutting edge and an auxiliary cutting edge in part of a long-side ridgeline and a short-side ridgeline adjacent to a pair of corner cutting edges of an upper surface; the main cutting edge being constituted by first to third straight cutting edges; the first to third straight cutting edges being connected in a bent-line shape with inward obtuse crossing angles when viewed from above, such that the second straight cutting edge is positioned outermost; and cutting edge angles $\beta_1$, $\beta_2$, $\beta_3$ between the rake faces and flanks of the first to third straight cutting edges meeting the relation of $\beta_1 > \beta_2 > \beta_3$.

10 Claims, 17 Drawing Sheets

(52) U.S. Cl.
CPC .......... *B23C 2200/0494* (2013.01); *B23C 2200/203* (2013.01); *B23C 2200/205* (2013.01); *B23C 2200/28* (2013.01); *B23C 2200/286* (2013.01)

(58) Field of Classification Search
CPC ........ B23C 2200/203; B23C 2200/205; B23C 2200/286
See application file for complete search history.

(56) References Cited

U.S. PATENT DOCUMENTS

| | | | |
|---|---|---|---|
| 7,976,250 | B2 | 7/2011 | Fang et al. |
| 8,057,132 | B2 * | 11/2011 | Johansson ............... B23C 5/202 407/113 |
| 8,491,234 | B2 | 7/2013 | Fang et al. |
| 8,974,156 | B2 | 3/2015 | Burtscher |
| 8,998,542 | B2 | 4/2015 | Ishi |
| 9,168,589 | B2 | 10/2015 | Ramesh |
| 9,272,342 | B2 | 3/2016 | Ishi |
| 2010/0202839 | A1 | 8/2010 | Fang et al. |
| 2010/0303563 | A1 | 12/2010 | Fang et al. |
| 2012/0308318 | A1 | 12/2012 | Burtscher |
| 2013/0022423 | A1 | 1/2013 | Ramesh |
| 2013/0115022 | A1 | 5/2013 | Ishi |
| 2014/0298967 | A1 | 10/2014 | Ishi |
| 2016/0121411 | A1 | 5/2016 | Ishi |

FOREIGN PATENT DOCUMENTS

| | | | |
|---|---|---|---|
| EP | 0 358 623 | A1 | 3/1990 |
| JP | 2003-260607 | A | 9/2003 |
| JP | 2006-75913 | A | 3/2006 |
| JP | 2006-82168 | A | 3/2006 |
| JP | 2006-181702 | A | 7/2006 |
| JP | 2008-213078 | A | 9/2008 |
| JP | 2008-254129 | A | 10/2008 |
| JP | 2008-279519 | A | 11/2008 |
| JP | 2013-121639 | A | 6/2013 |
| JP | 2013-520323 | A | 6/2013 |
| JP | 2013-536094 | A | 9/2013 |
| WO | 2013/065393 | A1 | 5/2013 |

OTHER PUBLICATIONS

Communication dated Sep. 5, 2017 from the European Patent Office in counterpart application No. 15743586.8.
Communication dated Apr. 6, 2017, from the State Intellectual Property Office of People's Republic of China in counterpart Application No. 201580005899.9.

* cited by examiner

US 10,189,097 B2

INSERT AND INDEXABLE ROTARY CUTTING TOOL

CROSS REFERENCE TO RELATED APPLICATIONS

This application is a National Stage of International Application No. PCT/JP2015/052066 filed Jan. 26, 2015 (claiming priority based on Japanese Patent Application Nos. 2014-013424, filed Jan. 28, 2014, and 2014-171909, filed Aug. 26, 2014), the contents of which are incorporated herein by reference in their entirety.

FIELD OF THE INVENTION

The present invention relates to an insert suitable for cutting a difficult-to-cut material, and an indexable rotary cutting tool to which this insert is detachably attached.

BACKGROUND OF THE INVENTION

Though an indexable rotary cutting tool having cemented carbide inserts detachably attached to a tool body can cut a work with high efficiency, the life of the insert decreases by the premature wearing of rake faces and flanks of cutting edges and the chipping and breakage of cutting edges due to a cutting load. Particularly in the cutting of difficult-to-cut materials such as stainless steel, heat-resistant alloys such as Ni-based alloys (for example, Inconel®), Ti alloys, etc., inserts suffer extreme decrease in life. To increase the life of inserts, various improvements of inserts have been proposed.

JP 2003-260607 A proposes an insert having sufficient cutting edge strength with reduced cutting resistance, which comprises as shown in FIG. 25, nose portions 112 at corners of an insert body having a substantially parallelogramatic plate shape, and long-side cutting edges 115 and short-side cutting edges 116 formed along ridgelines of a pair of adjacent flanks 113, 114 on both sides of each nose portion 112 and an upper surface, each long-side cutting edge 115 being inclined toward a bottom surface 117 as separating from the nose portion 112, and having a gently projecting circular cutting edge 118 and a straight cutting edge 119 in this order from the nose portion 112, and the projecting circular cutting edge 118 having an upper flank 121 and a lower flank 120. Because the lower flank 120 has larger clearance angle than the upper flank 121, a sufficient clearance angle can be secured without decreasing the strength of the projecting circular cutting edge 118 to which a large cutting load is applied. However, because the entire long-side cutting edge 115 has a cutting edge comprising the circular cutting edge 118 and the straight cutting edge 119, sufficient strength cannot be secured particularly in the straight cutting edge 119. In addition, finishing the projecting circular cutting edge 118 with high precision needs a high machining cost.

JP 2008-213078 A proposes, as shown in FIG. 26, an insert comprising an insert body 201 having a substantially parallelogramatic plate shape having rake faces 202 and flanks 204 on upper and side surfaces, gently outward curved main cutting edges 207 each extending between the rake face 202 and the flank 204 from a corner cutting edge 206 to a corner portion 209 having an obtuse angle, a fixing hole 205 penetrating from the upper surface to the lower surface for receiving a cramping screw, and auxiliary cutting edges 208; each flank 204 having a twisted surface portion 204A, a concaved portion 204B and a flat surface portion 204C in this order from the main cutting edge 207; and the concaved portion 204B having a radius of curvature larger in a center portion than in the corner to increase the strength of the cutting edge 207. In this insert, the main cutting edge 207 has a gradually increasing clearance angle by the twisted surface portion 204A, as going from the corner cutting edge 206 to the obtuse corner portion 209. However, such main cutting edge 207 does not have sufficient strength, because it does not have a sufficient clearance angle near the corner cutting edge 206 to which the largest cutting load is applied. In addition, finishing the outward curved main cutting edge 207 with high precision needs a high machining cost.

JP 2006-75913 A proposes, as shown in FIG. 27, an insert comprising main cutting edges 309 and auxiliary cutting edges 310 each connected to one end of each corner cutting edge 307 of a substantially equilateral-triangular, plate-shaped insert body 301; each main cutting edge 309 having a rake face 306 in an upper surface 302; each auxiliary cutting edge 310 having a flank 304 on a side surface; each main cutting edge 309 being constituted by first and second straight cutting edge portions 309A and 309B; and each auxiliary cutting edge 310 being constituted by a third straight cutting edge portion, whereby pluralities of straight cutting edge portions obtained by the main cutting edges 309 crossing with obtuse angles are in a bent-line shape. With such a shape, the entire length of cutting edges can be made shorter, suppressing the decrease and variation of cutting resistance, and dividing chips at intersections of straight cutting edges. However, it fails to describe the clearance angle of the first and second straight cutting edges 309A, 309B constituting the main cutting edge 309.

OBJECT OF THE INVENTION

Accordingly, the first object of the present invention is to provide an insert having good cutting performance and improved cutting edge strength while avoiding increase and variation of cutting resistance.

The second object of the present invention is to provide an indexable rotary cutting tool to which such inserts are detachably attached.

DISCLOSURE OF THE INVENTION

Thus, the insert according to the first embodiment of the present invention comprises substantially parallelogramatic upper and lower surfaces, and a screw-receiving hole penetrating from the upper surface to the lower surface;
a pair of corner portions of the upper surface having corner cutting edges;
part of a long-side ridgeline and a short-side ridgeline adjacent to the corner cutting edge having a main cutting edge and an auxiliary cutting edge both inclined downward;
the upper surface having rake faces for the main cutting edges and the auxiliary cutting edges;
the side surface having flanks for the main cutting edges and the auxiliary cutting edges;
the main cutting edge being constituted by first to third straight cutting edges;
the first to third straight cutting edges being connected in a bent-line shape with inward obtuse crossing angles when viewed from above, such that the second straight cutting edge is positioned outermost; and
a cutting edge angle $\beta_1$ between the rake face and flank of the first straight cutting edge, a cutting edge angle $\beta_2$ between the rake face and flank of the second straight cutting edge, and a cutting edge angle $\beta_3$ between the rake face and flank of the third straight cutting edge meeting the relation of $\beta_1 > \beta_2 > \beta_3$.

The length of the main cutting edge is preferably ⅓-¾ of the entire length of the long-side ridgeline.

The length $L_1$ of the first straight cutting edge and the length $L_2$ of the second straight cutting edge preferably meet the relation of $L_1 \leq L_2$.

The long-side ridgeline preferably has first and second cutting-edge-free connecting ridgeline portions connected to the third straight cutting edge, the first connecting ridgeline portion being connected to the third straight cutting edge with an inward obtuse angle when viewed from above.

An angle $\theta_1$ between the upper and side surfaces of the first connecting ridgeline portion preferably meets the relation of $\theta_1 > \beta_1$.

The first connecting ridgeline portion is preferably smoothly connected to the third straight cutting edge in the form of an upward projecting gentle curve at a point S when viewed from side, a crossing angle $\alpha_3$ of the second straight cutting edge to a vertical line at a point R connected to the third straight cutting edge, and a crossing angle $\alpha_4$ of the first connecting ridgeline portion to a vertical line at a point S connected to the third straight cutting edge meeting the relation of $\alpha_3 < \alpha_4 \leq 90°$.

An angle $\theta_2$ between a notched surface and a side surface contiguous to the second connecting ridgeline portion preferably meets the relation of $\theta_2 > \beta_1$.

In the insert according to the second embodiment of the present invention, an inclined surface higher on the side of the screw-receiving hole is formed in an upper surface portion between both ends of the first connecting ridgeline portion, such that a crossing angle of the upper surface to the side surface at both ends of the first connecting ridgeline portion is more than 90°.

In the insert according to the third embodiment of the present invention,
the upper surface is provided with an inclined surface extending from the end S to an end U of the second connecting ridgeline portion, such that the inclined surface is highest at an end S of the first connecting ridgeline portion when viewed from side;
the inclined surface is provided with a notched surface contiguous to the first and second connecting ridgeline portions; and
the width of the notched surface is substantially 0 at the ends S and U, and continuously increases in a region from the end S to the connecting point T and continuously decreases in a region from the connecting point T to the end U, such that it is maximum at the connecting point T of the first and second connecting ridgeline portions.

An angle γ of the first connecting ridgeline portion to the second connecting ridgeline portion when viewed from side (defined as a crossing angle of a straight line ST to a straight line TU) is preferably 160-176°.

The indexable rotary cutting tool of the present invention comprises the above inserts each detachably fixed to an insert seat with a cramping screw, the second straight cutting edge being located at the outermost peripheral position, and in parallel with the rotation axis O.

DESCRIPTION OF THE PREFERRED EMBODIMENTS

Figure 1:
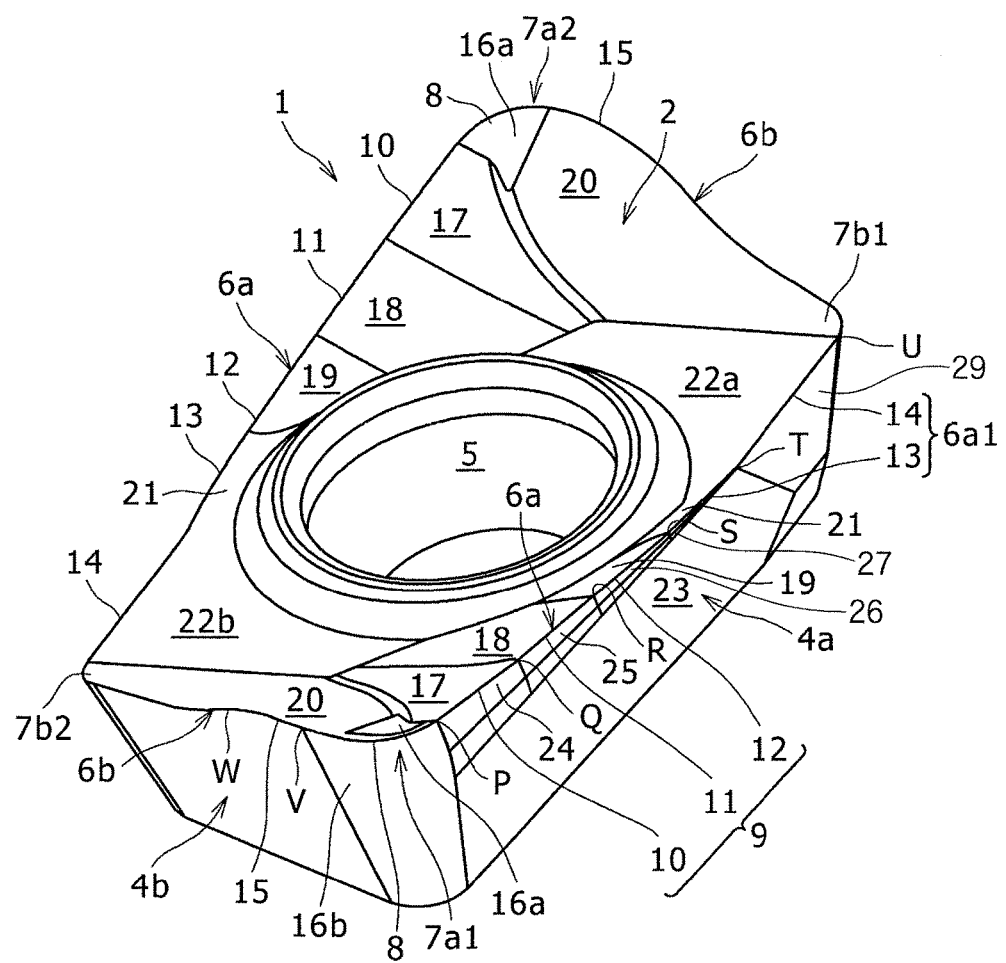
FIG. 1 is a perspective view showing an insert according to the first embodiment of the present invention.

The embodiments of the present invention will be explained in detail below referring to the attached drawings. Explanations of one embodiment are applicable to other embodiments unless otherwise mentioned. The same reference numerals are assigned to portions common in all embodiments.

[1] Insert

The insert of the present invention is preferably formed by a hard material such as cemented carbide, ceramics, etc. For example, an insert of cemented carbide can be produced by press-molding mixed powder comprising WC powder and Co powder as main components, and then sintering the resultant compact at a temperature of about 1300° C.

(A) First Embodiment

FIGS. 1-4 show an insert 1 according to the first embodiment of the present invention. This insert 1 has a substantially parallelogramatic plate shape comprising opposing upper and lower surfaces 2, 3; a pair of long side surfaces 4a, 4a and a pair of short side surfaces 4b, 4b connecting the upper surface 2 and the lower surface 3; and a screw-receiving hole 5 penetrating the insert 1 in its substantially center portion from the upper surface 2 to the lower surface 3. The lower surface 3 of the insert 1 is a flat bottom surface coming into close contact with a seating surface of a tool body as described later. The screw-receiving hole 5 is a hole through which a cramping screw 38 penetrates when the insert 1 is fixed to the insert seat 33 of the tool body by the cramping screw 38 (see FIG. 23). When the insert 1 is fixed to the insert seat 33 by fastening the cramping screw 38, the flat lower surface 3 of the insert 1 comes into close contact with the seating surface 34 of the insert seat 33.

Figure 2:
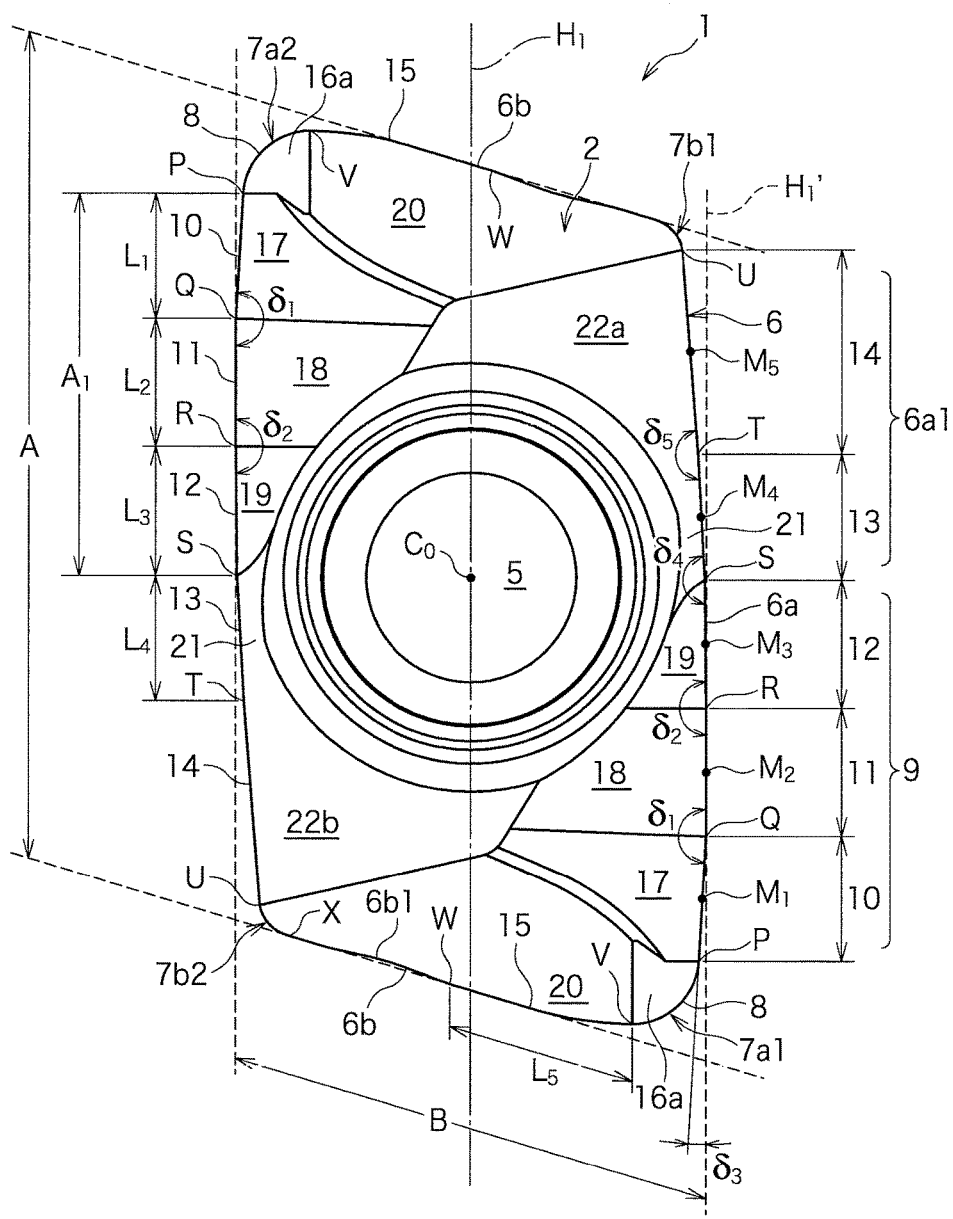
FIG. 2 is a plan view showing the insert according to the first embodiment of the present invention.

As shown in FIG. 2, a ridgeline 6 between the upper surface 2 and a side surface is constituted by a pair of opposing long-side ridgelines 6a, 6a coming into contact with the long side surfaces 4a, 4a, and a pair of opposing short-side ridgelines 6b, 6b coming into contact with the short side surfaces 4b, 4b and crossing the long-side ridgelines 6a, 6a. The entire length A of each long-side ridgeline 6a, 6a is a distance between a pair of short side surfaces 4b, 4b in parallel with a centerline $H_1$ passing a center $C_0$ of the screw-receiving hole 5.

As shown in FIG. 2, four corner portions, in each of which a long-side ridgeline 6a, 6a crosses a short-side ridgeline 6b, 6b, are constituted by a pair of first arcuate corner portions 7a1, 7a2 and a pair of second arcuate corner portions 7b1, 7b2, which are symmetric with respect to the center $C_0$ of the screw-receiving hole 5. In each first arcuate corner portion 7a1, 7a2, the long-side ridgeline 6a crosses the short-side ridgeline 6b with an acute angle, and in each second arcuate corner portion 7b1, 7b2, the long-side ridgeline 6a crosses the short-side ridgeline 6b with an obtuse angle.

(1) Cutting Edge

As shown in FIG. 2, an arcuate corner cutting edge 8 is formed along a ridgeline of each first arcuate corner portion 7a1, 7a2, in which the long-side ridgeline 6a crosses the short-side ridgeline 6b with an acute angle, and a main cutting edge 9 is formed along the long-side ridgeline 6a extending from an end P of the corner cutting edge 8. On the other hand, a ridgeline of each second arcuate corner portion 7b1, 7b2, in which the long-side ridgeline 6a crosses the short-side ridgeline 6b with an obtuse angle, does not have a cutting edge. Each long-side ridgeline 6a has a main cutting edge 9, and each short-side ridgeline 6b has an auxiliary cutting edge 15.

(a) Main Cutting Edge

The main cutting edge 9 is a bent-line-shaped cutting edge comprising along the long-side ridgeline 6a a first straight cutting edge 10 of length $L_1$ extending from a point P (one end of the corner cutting edge 8) to a point Q, a second straight cutting edge 11 of length $L_2$ extending from the point Q to a point R, and a third straight cutting edge 12 of length $L_3$ extending from the point R to a point S. The length $L_1$, $L_2$, $L_3$ is determined along the centerline $H_1$. The first straight cutting edge 10 is inward inclined relative to a straight line $H_1'$ parallel to the centerline $H_1$, such that the end P on the side of the corner cutting edge 8 is closer to the screw-receiving hole 5 than the end Q on the side of the second straight cutting edge 11, and connected to the second straight cutting edge 11 with an obtuse crossing angle $\delta_1$ (on the side of the screw-receiving hole 5) at the point Q. The second straight cutting edge 11 is connected to the third straight cutting edge 12 with an obtuse crossing angle $\delta_2$ (on the side of the screw-receiving hole 5) at the point R. Among the first to third straight cutting edges 10, 11, 12, the second straight cutting edge 11 is positioned outermost in the insert 1.

The first straight cutting edge 10 subjected to the largest cutting load is inclined outward from the corner cutting edge 8. The inclination angle $\delta_3$ of the first straight cutting edge 10 to the straight line $H_1'$ is preferably 1.0-3.0°, more preferably 1.5-2.5°.

The crossing angles $\delta_1$, $\delta_2$ of the first to third straight cutting edges 10, 11, 12 preferably meet the relation of $\delta_1 \leq \delta_2 < 180°$. Specifically, the crossing angle $\delta_1$ is preferably 176.1-179.5°, more preferably 177.6-178.0°. The crossing angle $\delta_2$ is preferably 176.1-179.5°, more preferably 178.5-178.9°. The bent-line-shaped main cutting edge 9 constituted by the first to third straight cutting edges 10, 11, 12 connected with such crossing angles $\delta_1$, $\delta_2$ can divide and discharge chips generated by cutting stably rearward (upward), so that it can be made shorter than when it is outward curved, resulting in smaller variation width of cutting resistance. With easy discharge of chips, damage is prevented on acting surfaces of the tool body 31 and a work. An indexable rotary cutting tool, to which inserts 1 each having such main cutting edges 9 are attached, are suitable for cutting mainly an uprising wall, particularly a vertical wall, of a work.

As shown in FIG. 2, a long-side ridgeline portion 6a1 having no cutting edge, which extends from the end S of the third straight cutting edge 12, comprises a first connecting ridgeline portion 13 extending from the point S to the point T, and a second connecting ridgeline portion 14 extending from the point T to the point U (one end of the second corner portion 7b1). Because of no cutting edges, the first and second connecting ridgeline portions 13, 14 are positioned inside the first to third straight cutting edges 10, 11, 12 (on the side of the centerline $H_1$).

When a tool to which inserts 1 having the main cutting edges 9 are attached is used for cutting an uprising wall of a work (for example, difficult-to-cut material), the formation of the main cutting edge 9 over the entire length of the long-side ridgeline 6a exerts too large a cutting load to the main cutting edge 9, damaging the main cutting edge 9, and providing the cut surface with lower accuracy by vibration.

Accordingly, in the insert 1 of the present invention, the main cutting edge 9 does not extend over the entire length of the long-side ridgeline 6a.

The length $A_1$ of the main cutting edge 9 constituted by the first to third straight cutting edges 10, 11, 12 connected in a bent-line shape preferably meets the relation of $A_1/A=\frac{1}{3}-\frac{3}{4}$, wherein A represents the entire length of the long-side ridgeline 6a. When $A_1/A$ exceeds $\frac{3}{4}$, too large a cutting load is likely applied to the main cutting edge 9, damaging the main cutting edge 9, and causing vibration. On the other hand, when $A_1/A$ is less than $\frac{1}{3}$, the main cutting edge 9 is too short, resulting in low cutting efficiency, and excessively concentrating a cutting load in a short main cutting edge 9.

When a vertical wall of a work is cut by an indexable rotary cutting tool having inserts 1 each attached to each insert seat 33 of a tool body 31, such that the second straight cutting edge 11 is in parallel with a rotation axis O of the tool, (a) the second straight cutting edge 11 is mainly used for cutting the vertical wall of a work, and (b) because the rotation loci of three straight cutting edges 10, 11, 12 constitute surfaces close to a cylindrical surface with a rotation axis O as a center, the three straight cutting edges 10, 11, 12 provide a cut surface with suppressed steps, resulting in cutting with high precision and high surface quality.

Because it is preferable to use mainly the second straight cutting edge 11, center of the three straight cutting edges 10, 11, 12, to cut a vertical wall of a work with high precision, it is preferable that the length $L_1$ of the first straight cutting edge 10 and the length $L_2$ of the second straight cutting edge 11 meet the relation of $L_1 \leq L_2$, and that the length $L_3$ of the third straight cutting edge 12 is equal to or less than the length $L_1$ of the first straight cutting edge 10.

A connecting ridgeline 6a1 connected at the point S to the third straight cutting edge 12 is constituted by a first connecting ridgeline portion 13 and a second connecting ridgeline portion 14. To prevent the first connecting ridgeline portion 13 having no cutting edge from coming into contact with a work surface, the first connecting ridgeline portion 13 is preferably inclined inward (on the side of the screw-receiving hole 5) with a crossing angle $\delta_4$ to the third straight cutting edge 12. The crossing angle $\delta_4$ is preferably 183-187°, more preferably 184-186°. Likewise, when the second connecting ridgeline portion 14 having no cutting edge is inclined inward from the first connecting ridgeline portion 13, contact with a work surface can be more surely prevented. The crossing angle $\delta_5$ of the second connecting ridgeline portion 14 to the first connecting ridgeline portion 13 is preferably 165-178°. The length $L_4$ of the first connecting ridgeline portion 13 is preferably 90-110% of the length $L_3$ of the third straight cutting edge 12.

(b) Auxiliary Cutting Edge

As shown in FIG. 2, the insert 1 of the present invention comprises an auxiliary cutting edge 15 extending along the short-side ridgeline 6b from the other end V of the corner cutting edge 8 by length $L_5$ (length along the short-side ridgeline 6b). The auxiliary cutting edge 15 is straight or gently curved outward. When a work is cut by an indexable rotary cutting tool, to which the inserts 1 are attached, the auxiliary cutting edge 15 cuts a bottom surface of the work. The other end W of the auxiliary cutting edge 14 is connected to the short-side ridgeline portion 6b 1 having no cutting edge, and the short-side ridgeline portion 6b 1 is connected to one end X of the corner portion 7b2 (7b 1). The auxiliary cutting edge 15 has a rake face 20 and a flank 20a.

(2) Upper Surface of Insert

As shown in FIGS. 1 and 2, the insert 1 has a screw-receiving hole 5 penetrating from the upper surface 2 to the lower surface 3 in its center portion. The screw-receiving hole 5 is a hole through which a cramping screw 38 for fixing the insert 1 to the insert seat 33 of the tool body 31 penetrates.

Figure 3:
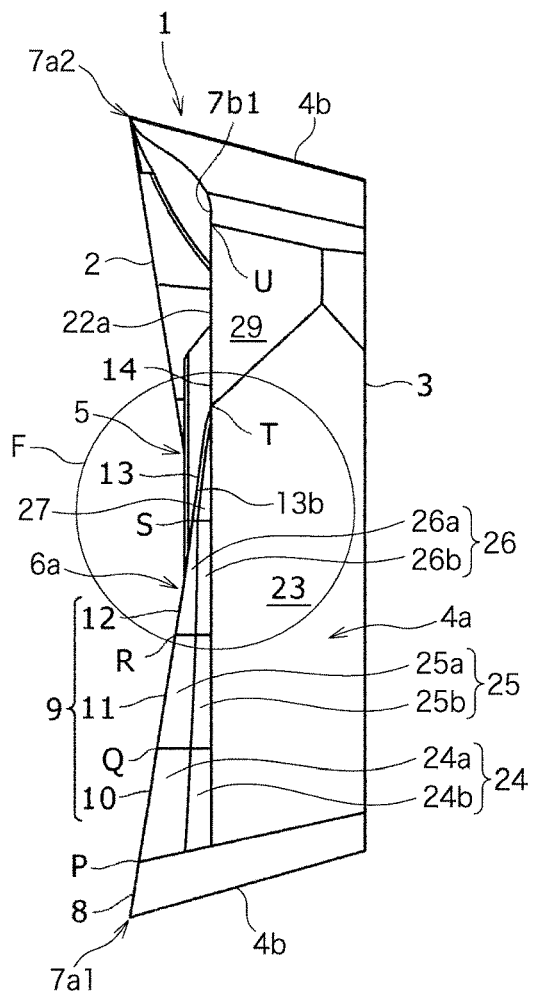
FIG. 3 is a side view showing the insert according to the first embodiment of the present invention.

As shown in FIGS. 1 and 3, because the upper surface 2 of the insert 1 is higher in each corner portion 7a1, 7a2, 7b1, 7b2 and its vicinity than in the center portion (near an opening of the screw-receiving hole 5), the main cutting edge 9 constituted by the first to third straight cutting edges 10, 11, 12 extending from each corner cutting edge 8 is downward inclined (the point Q is lower than the point P, the point R is lower than the point Q, and the point S is lower than the point R), and the auxiliary cutting edge 15 connected to the corner cutting edge 8 and the short-side ridgeline portion 6b 1 are inclined downward from the corner cutting edge 8 (the point W is lower than the point V, and the point X is lower than the point W). Accordingly, a rake face 16a of the corner cutting edge 8, a rake face 17 of the first straight cutting edge 10, a rake face 18 of the second straight cutting edge 11, a rake face 19 of the third straight cutting edge 12, and a rake face 20 of the auxiliary cutting edge 15 are inclined downward toward the center $C_0$. Incidentally, the first connecting ridgeline portion 13 connected to the third straight cutting edge 12 is also inclined downward until reaching the point T, but the second connecting ridgeline portion 14 extending from the point T to the point U is in parallel with the lower surface 3. As shown in FIGS. 1 and 2, flat upper surface portions 22a, 22b constituting part of the upper surface 2 are in parallel with the bottom surface 3, and connected to these rake faces.

(3) Side Surface of Insert

Figure 4:
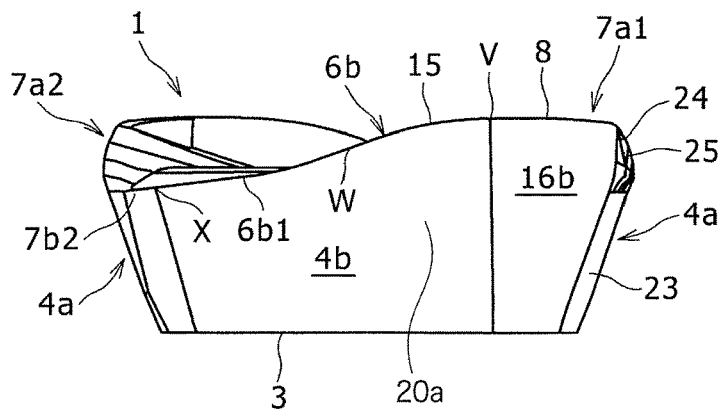
FIG. 4 is a front view showing the insert according to the first embodiment of the present invention.

As shown in FIGS. 3 and 4, the first corner portion 7a1 comprises a flank 16b contiguous to the corner cutting edge 8; the long side surface 4a contiguous to the long-side ridgeline 6a comprises a flat constraining surface 23, a flank 24 of the first straight cutting edge 10, a flank 25 of the second straight cutting edge 11, a flank 26 of the third straight cutting edge 12, and a side surface portion 27 contiguous to the first connecting ridgeline portion 13; and the side surface portion 4b contiguous to the short-side ridgeline 6b comprises a flank 20a of the auxiliary cutting edge 15.

Figure 23:
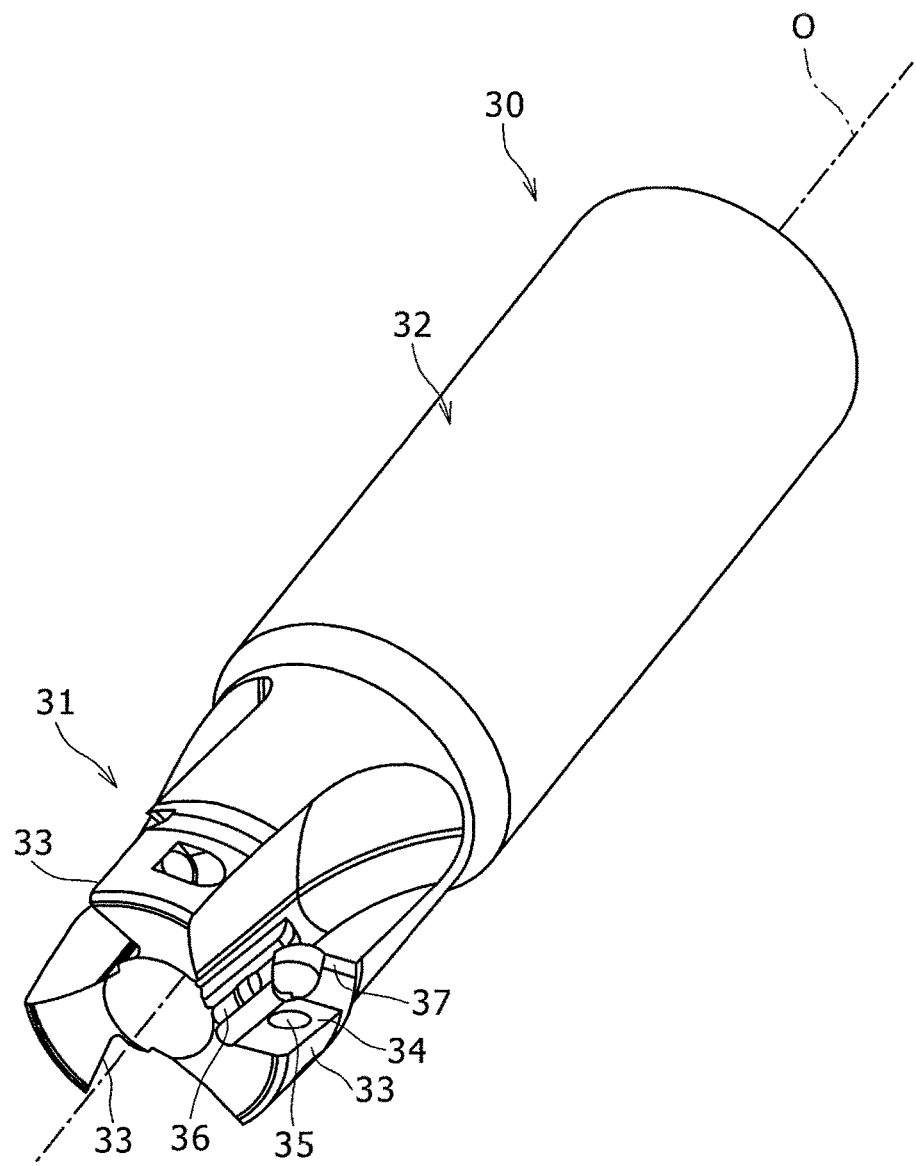
FIG. 23 is a perspective view showing an example of tool bodies constituting the indexable rotary cutting tool of the present invention.

When the insert 1 is fixed to the insert seat 33 of the tool body 31, the constraining surface 23 firmly comes into close contact with a long-side constraining wall surface 36 of the insert seat 33 (see FIG. 23). To have high rigidity (strength) with a large cutting edge angle of each straight cutting edge 10, 11, 12, flanks 24, 25, 26 between the first to third straight cutting edges 10, 11, 12 and the constraining surface 23 are inclined outward in the insert 1 as shown in FIG. 4. To provide the first connecting ridgeline portion 13 with high rigidity (strength), the side surface portion 27 is also inclined outward in the insert 1. Each flank 24, 25, 26 is constituted by a first flank 24a, 25a, 26a contiguous to each of the first to third straight cutting edges 10, 11, 12, and a curved second flank 24b, 25b, 26b contiguous to the constraining surface 23. The side surface portion 27 of the first connecting ridgeline portion 13 is constituted by a first side surface portion 27a and a second side surface portion 27b.

As shown in FIG. 4, the side surface portion 4b is a flank 20a of the auxiliary cutting edge 15, and also acts as a constraining surface firmly coming into close contact with the short-side constraining wall surface 37 of the insert seat 33 when the insert 1 is fixed to the insert seat 33 of the tool body 31 (see FIG. 23).

(4) Cutting Edge Angle, Ridge Angle and Inclination Angle

When a vertical wall of a work is cut by the insert 1, stress is likely concentrated in a region extending from the connecting point S of the third straight cutting edge 12 and the first connecting ridgeline portion 13 toward the first connecting ridgeline portion 13, due to a cutting load applied to the main cutting edge 9, resulting in large wearing. Also, when chips are bitten during cutting, breakage likely occurs near the connecting point S of the third straight cutting edge 12 and the first connecting ridgeline portion 13. To prevent such problem, a cutting edge angle of each cutting edge, a ridge angle of each connecting ridgeline portion, and their inclination angles are adjusted in the insert 1 of the present invention as described below.

(a) Cutting Edge Angle of Main Cutting Edge

As shown in FIGS. 5-8, the insert 1 of the present invention is characterized in that the main cutting edge 9 has a cutting edge angle continuously (linearly) decreasing in a region from the point P to the point R. Accordingly, the cutting edge angles of the first to third straight cutting edges 10, 11, 12 continuously decrease in a region from the point P to the point R. The term "cutting edge angle" used herein means a crossing angle of a rake face and a flank in a perpendicular cross section of each cutting edge. Because each straight cutting edge has different cutting edge angles at both ends, a cutting edge angle at an end on the side of the corner cutting edge 8 is defined as a cutting edge angle of each straight cutting edge for convenience.

Figure 5:
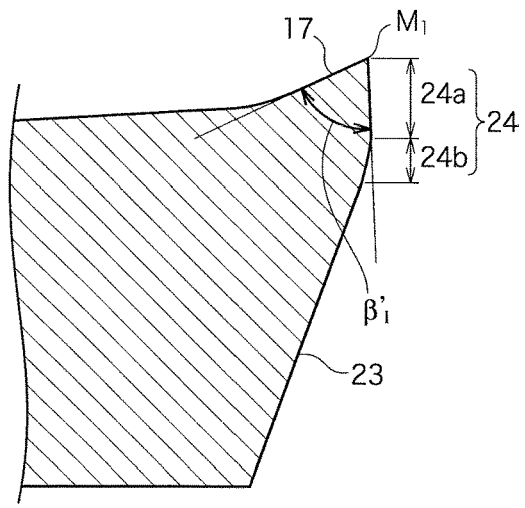
FIG. 5 is a partial cross-sectional view showing a cutting edge angle $\beta_1'$ at a point $M_1$ in the insert according to the first embodiment of the present invention.
Figure 6:
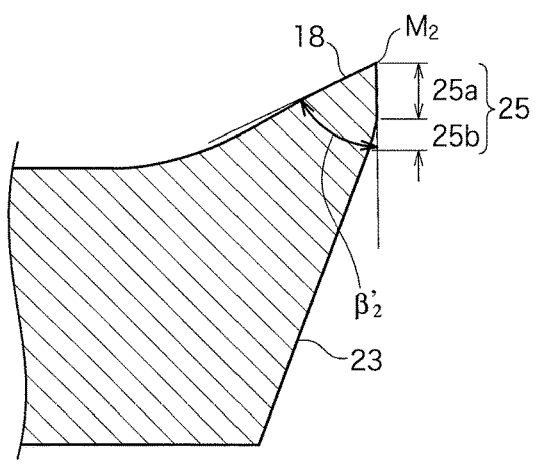
FIG. 6 is a partial cross-sectional view showing a cutting edge angle $\beta_2'$ at a point $M_2$ in the insert according to the first embodiment of the present invention.
Figure 7:
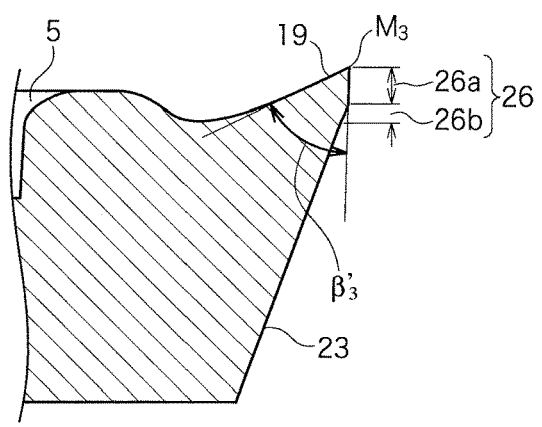
FIG. 7 is a partial cross-sectional view showing a cutting edge angle $\beta_3'$ at a point $M_3$ in the insert according to the first embodiment of the present invention.

The first straight cutting edge 10 has a cutting edge angle $\beta_1$ between the rake face 17 and the flank 24 (first flank 24a) at the point P; the second straight cutting edge 11 has a cutting edge angle $\beta_2$ between the rake face 18 and the flank 25 (second flank 25a) at the point Q; and the third straight cutting edge 12 has cutting edge angles $\beta_3$ and $\beta_4$ between the rake face 19 and the flank 26 (third flank 26a) at the points R and S. When the cutting edge angles $\beta_1$, $\beta_2$, $\beta_3$ and $\beta_4$ are determined, cutting edge angles $\beta_1'$, $\beta_2'$, $\beta_3'$ at a midpoint $M_1$ of the points P and Q, a midpoint $M_2$ of the points Q and R, and a midpoint $M_3$ of the points R and S are first determined as shown in FIGS. 5-7, and then plotted in FIG. 8. The cutting edge angles $\beta_1$, $\beta_2$, $\beta_3$ and $\beta_4$ are determined from FIG. 8.

The cutting edge angles $\beta_1$, $\beta_2$, $\beta_3$ of the first to third straight cutting edges 10, 11, 12 should meet the relation of $\beta_1 > \beta_2 > \beta_3$. A cutting edge has higher strength by a larger cutting edge angle. Accordingly, the first straight cutting edge 10 first coming into contact with a work whose vertical wall is cut by the main cutting edge 9 has the highest strength, because of the maximum cutting edge angle $\beta_1$. On the other hand, because the third straight cutting edge 12 has the minimum cutting edge angle $\beta_3$, it exhibits good cutting performance with small cutting resistance, so that a work surface cut by the third straight cutting edge 12 can have small roughness, with little burrs in boundaries with the work. Also, because the cutting edge angle $\beta_2$ of the second straight cutting edge 11 is middle between the cutting edge angle $\beta_1$ of the first straight cutting edge 10 and the cutting edge angle $\beta_3$ of the third straight cutting edge 12, the first to third straight cutting edges 10, 11, 12 have stably changing cutting resistance. With the conditions of $\beta_1 > \beta_2 > \beta_3$ met, specifically, $\beta_1$ is preferably 67-82°, $\beta_2$ is preferably 65-80°, and $\beta_3$ is preferably 63-78°.

(b) Connecting Ridgeline Portion

The first connecting ridgeline portion 13 has a ridge angle $\theta_1$ (corresponding to the cutting edge angle) between the upper surface portion 21 (see FIG. 2) and the side surface portion 27 (see FIG. 3) at the end S, and the second connecting ridgeline portion 14 have ridge angles $\theta_2$ and $\theta_3$ (corresponding to the cutting edge angles) between the upper surface portion 22a (see FIG. 2) and the side surface portion 29 (see FIG. 3) at the ends T and U. Like above, ridge angles $\theta_1'$ and $\theta_2'$ at a midpoint $M_4$ between the point S and the point T, and a midpoint $M_5$ between the point T and the point U are determined and plotted in FIG. 8. The ridge angles $\theta_1$, $\theta_2$ and $\theta_3$ are determined from FIG. 8.

Figure 9:
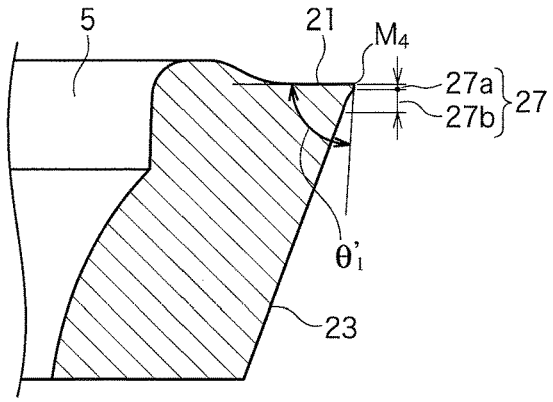
FIG. 9 is a partial cross-sectional view showing a ridge angle $\theta_1'$ of a first connecting ridgeline portion at a point $M_4$ in the insert according to the first embodiment of the present invention.
Figure 10:
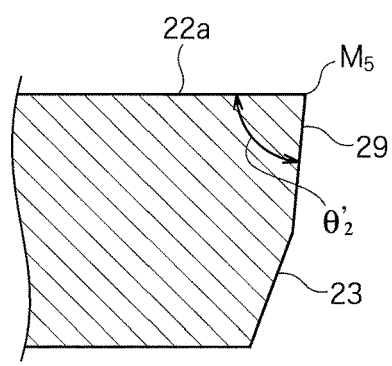
FIG. 10 is a partial cross-sectional view showing a ridge angle $\theta_2'$ of the first connecting ridgeline portion at a point $M_5$ in the insert according to the first embodiment of the present invention.

A ridge angle $\theta_1$ (corresponding to the cutting edge angle) between the upper surface portion 21 (see FIG. 2) and the side surface portion 27 (see FIG. 3) contiguous to the first connecting ridgeline portion 13 at the end S is shown in FIG. 9, and a ridge angle $\theta_2$ (corresponding to the cutting edge angle) between the upper surface portion 22a (see FIG. 2) and the side surface portion 29 (see FIG. 3) of the second connecting ridgeline portion 14 at the end T is shown in FIG. 10. When a vertical wall of a work is cut using the main cutting edge 9, a large cutting load is applied to the connecting point S of the third straight cutting edge 12 and the first connecting ridgeline portion 13, and its vicinity. Accordingly, the ridge angle $\theta_1$ of the first connecting ridgeline portion 13 at the end S and the cutting edge angle $\beta_1$ of the first straight cutting edge 10 preferably meet the relation of $\theta_1 > \beta_1$. To meet the relation of $\theta_1 > \beta_1$, the upper surface portion 21 of the first connecting ridgeline portion 13 is preferably on the same plane as the horizontal upper surface portion 22a. Because $\theta_1 > \beta_1$, the ridge angle $\theta_1$ of the first connecting ridgeline portion 13 at the end S is remarkably larger than the cutting edge angle $\beta_4$ of the third straight cutting edge 12 at the end S, preventing breakage, etc. in portions of the main cutting edge 9 and the first connecting ridgeline portion 13 near the point S.

The ridge angle $\theta_2$ of the second connecting ridgeline portion 14 and the cutting edge angle $\beta_1$ of the first straight cutting edge 10 also preferably meet the relation of $\theta_2 > \beta_1$. Because the flank (side surface) is inclined gradually inward in a region from one corner portion 7a1 to the other corner portion 7b1, $\theta_2$ is slightly smaller than $\theta_1$.

Figure 8:
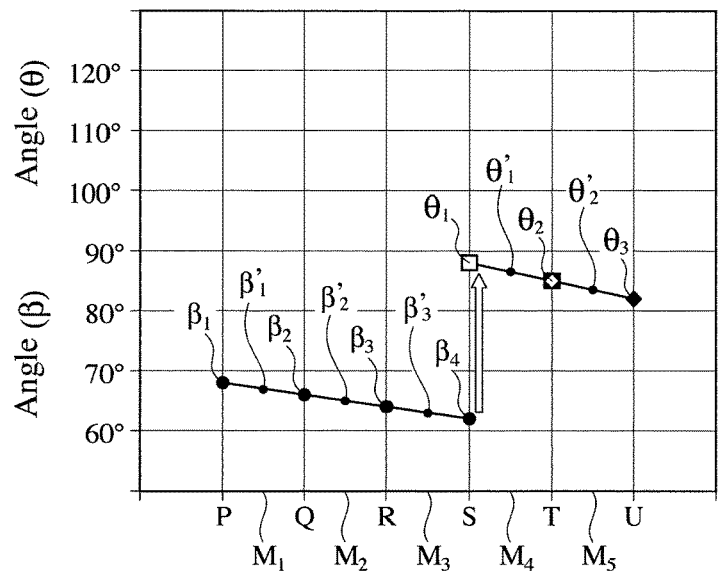
FIG. 8 is a graph showing the changes of $\beta_1$ to $\beta_4$ and $\theta_1$ to $\theta_3$ in the insert according to the first embodiment of the present invention.

The cutting edge angle $\beta_1$ of the first straight cutting edge 10 at the end P, the cutting edge angle $\beta_2$ of the second straight cutting edge 11 at the end Q, the minimum cutting edge angles $\beta_3$ and $\beta_4$ of the third straight cutting edge 12 at the ends R and S, the ridge angle $\theta_1$ of the first connecting ridgeline portion 13 at the end S, and the ridge angles $\theta_2$ and $\theta_3$ of the second connecting ridgeline portion 14 at the ends T and U are shown in FIG. 8. In the example shown in FIG. 8, $\beta_1$ is 68°, $\beta_2$ is 66°, $\beta_3$ is 64°, and $\beta_4$ (cutting edge angle of the third straight cutting edge 12 at the end S) is 62°. Also, $\theta_1$ is 88°, and $\theta_2$ is 85°.

Figure 11:
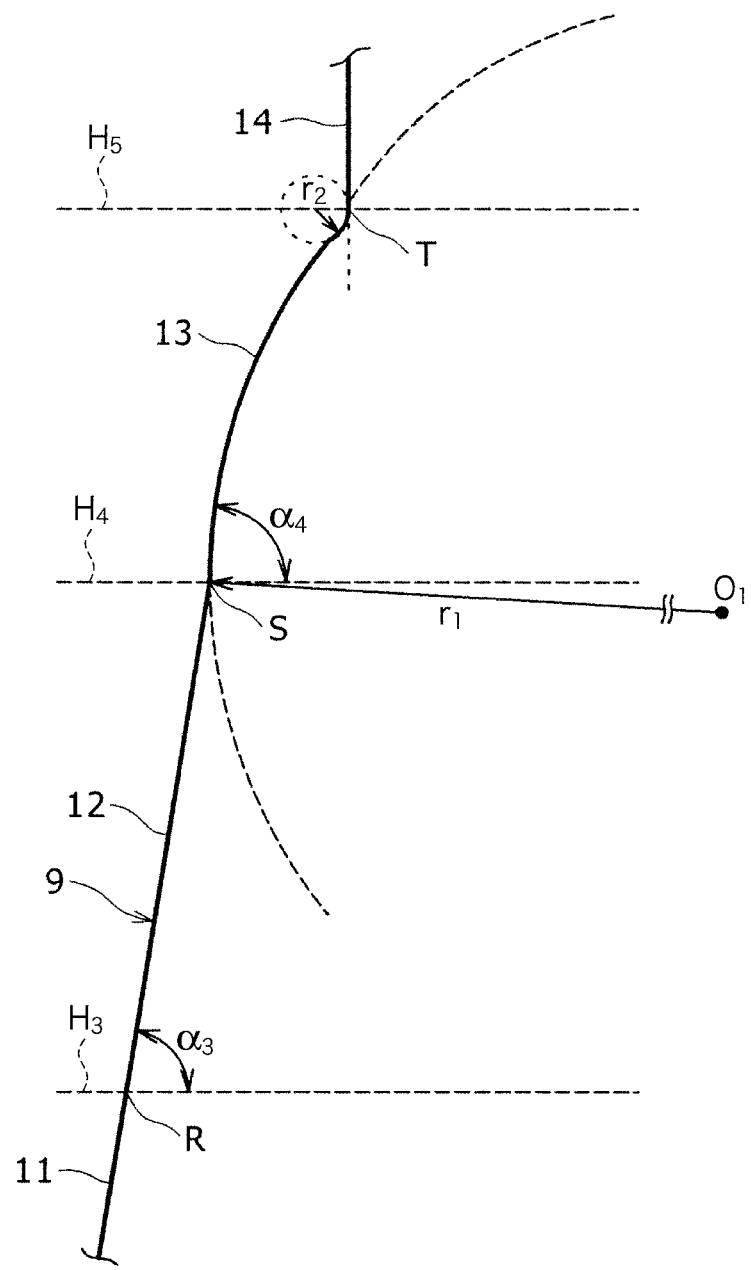
FIG. 11 is a partial enlarged view showing a cutting edge and first and second connecting ridgeline portions in a portion shown by a circle F in FIG. 3.

(c) Inclination Angles of Third Straight Cutting Edge and First Connecting ridgeline Portion Because breakage, etc. likely occur by a cutting load when the point S is angular, the third straight cutting edge 12 is preferably smoothly connected to the first connecting ridgeline portion 13 at the end S as shown in FIG. 11, and the first connecting ridgeline portion 13 is preferably gently outward curved or circular (referred to simply as "outward curved" below). As shown in FIG. 11, the third straight cutting edge 12 is inclined from the vertical line $H_3$ (perpendicular to the lower surface 3 of the insert 1) by an angle $\alpha_3$ at the point R, and the first connecting ridgeline portion 13 is inclined from the vertical line $H_4$ by an angle $\alpha_4$ at the point S. The inclination angle $\alpha_4$ is a crossing angle between a tangent line of the first connecting ridgeline portion 13 and the vertical line $H_4$ at the end S, as shown in FIG. 11.

The first connecting ridgeline portion 13 is preferably in the form of an upward projecting gentle curve smoothly connecting to the third straight cutting edge 12 at the point S, with the inclination angle $\alpha_4$ at the end S meeting the relation of $\alpha_3<\alpha_4\leq 90°$ to the inclination angle $\alpha_3$ of the third straight cutting edge 12 at the point R. When the inclination angle $\alpha_4$ is more than 90°, the third straight cutting edge 12 and the first connecting ridgeline portion 13 likely have an angular connecting point S, from which chipping occurs.

When the first connecting ridgeline portion 13 is in the form of an upward projecting gentle curve, the first connecting ridgeline portion 13 can be made thicker without having an angular connecting point S than when it is straight, providing the first connecting ridgeline portion 13 with improved strength, thereby preventing chipping near the connecting point S. When the upper surface portion 21 contiguous to the first connecting ridgeline portion 13 is gently upward projecting, the first connecting ridgeline portion 13 can be provided with further increased strength. When the first upward gently curved connecting ridgeline portion 13 is circular as shown in FIG. 11, its radius $r_1$ is preferably ⅓-2 of the entire length A of the long-side ridgeline 6a.

Because direct connection of the first upward gently curved connecting ridgeline portion 13 to the second connecting ridgeline portion 14 provides an angular point T, it is preferable as shown in FIG. 11 that the first connecting ridgeline portion 13 is smoothly connected to the second connecting ridgeline portion 14 with a circle having a very small radius $r_2$ (for example, about 1.0 mm). Though not depicted in FIG. 11, the inclination angles $\alpha_1$, $\alpha_2$ of the first straight cutting edge 10 (crossing angles of the first straight cutting edge 10 and the vertical line) at both ends P, Q are preferably equal to the inclination angle $\alpha_3$, such that the main cutting edge 9 is inclined downward with a uniform angle.

(B) Second Embodiment

Figure 12:
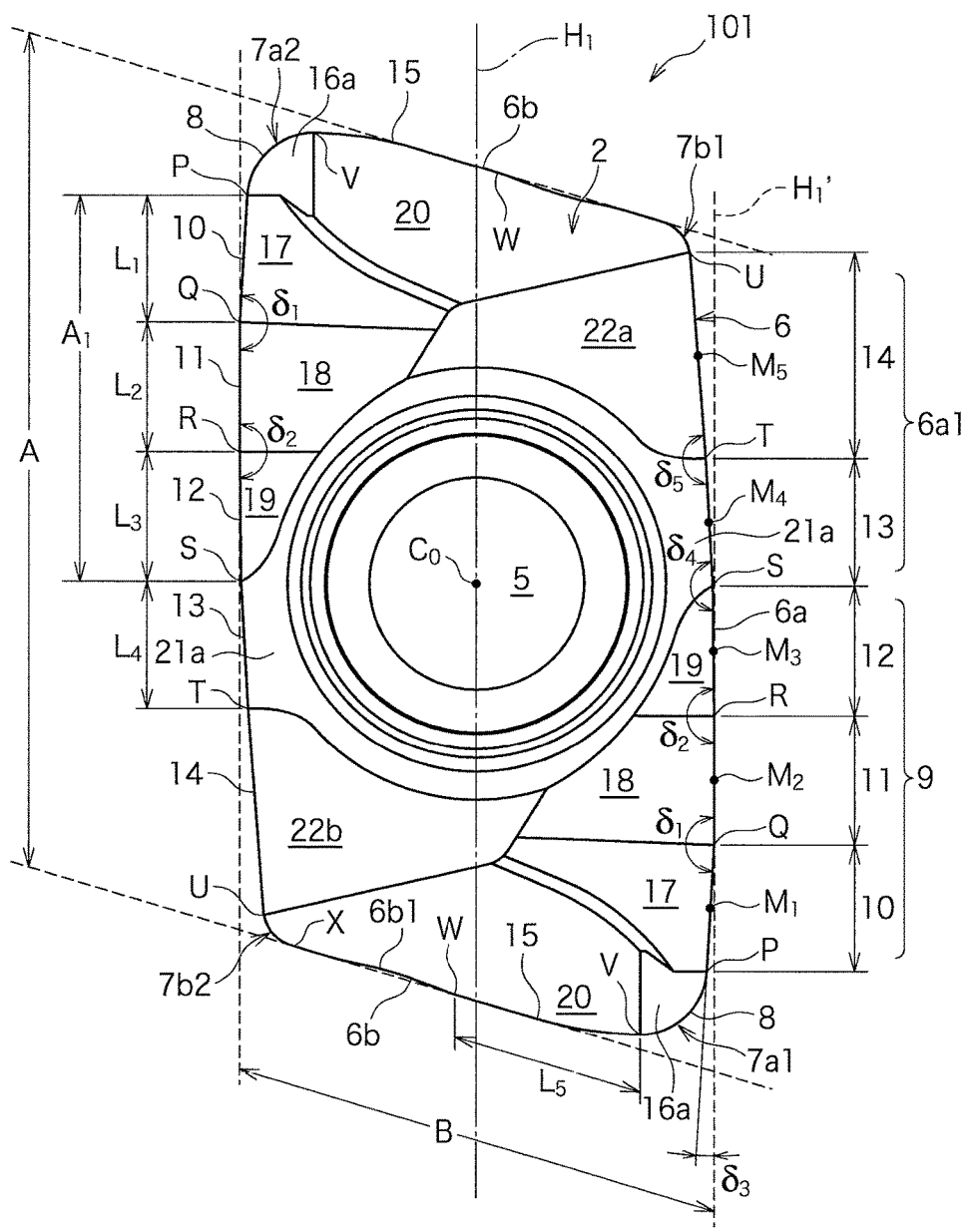
FIG. 12 is a plan view showing an insert according to the second embodiment of the present invention.
Figure 13:
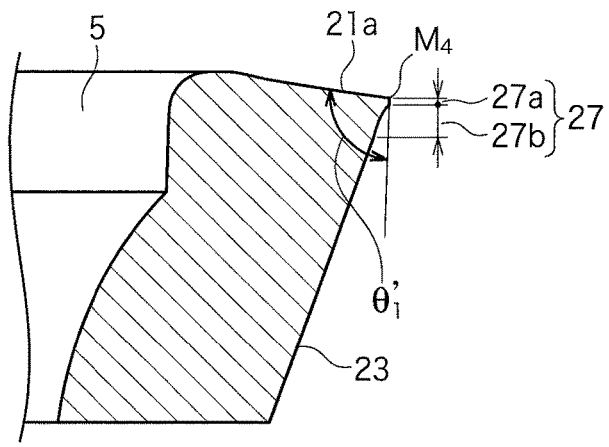
FIG. 13 is a partial cross-sectional view showing a ridge angle $\theta_1'$ of a first connecting ridgeline portion at a point $M_4$ in the insert according to the second embodiment of the present invention.
Figure 14:
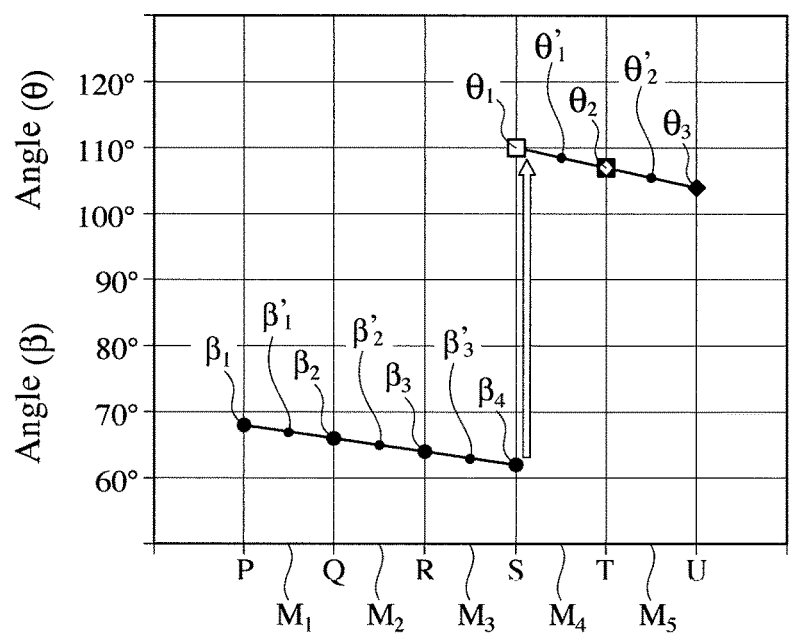
FIG. 14 is a graph showing the changes of $\beta_1$ to $\beta_4$ and $\theta_1$ to $\theta_3$ in the insert according to the second embodiment of the present invention.
Figure 15:
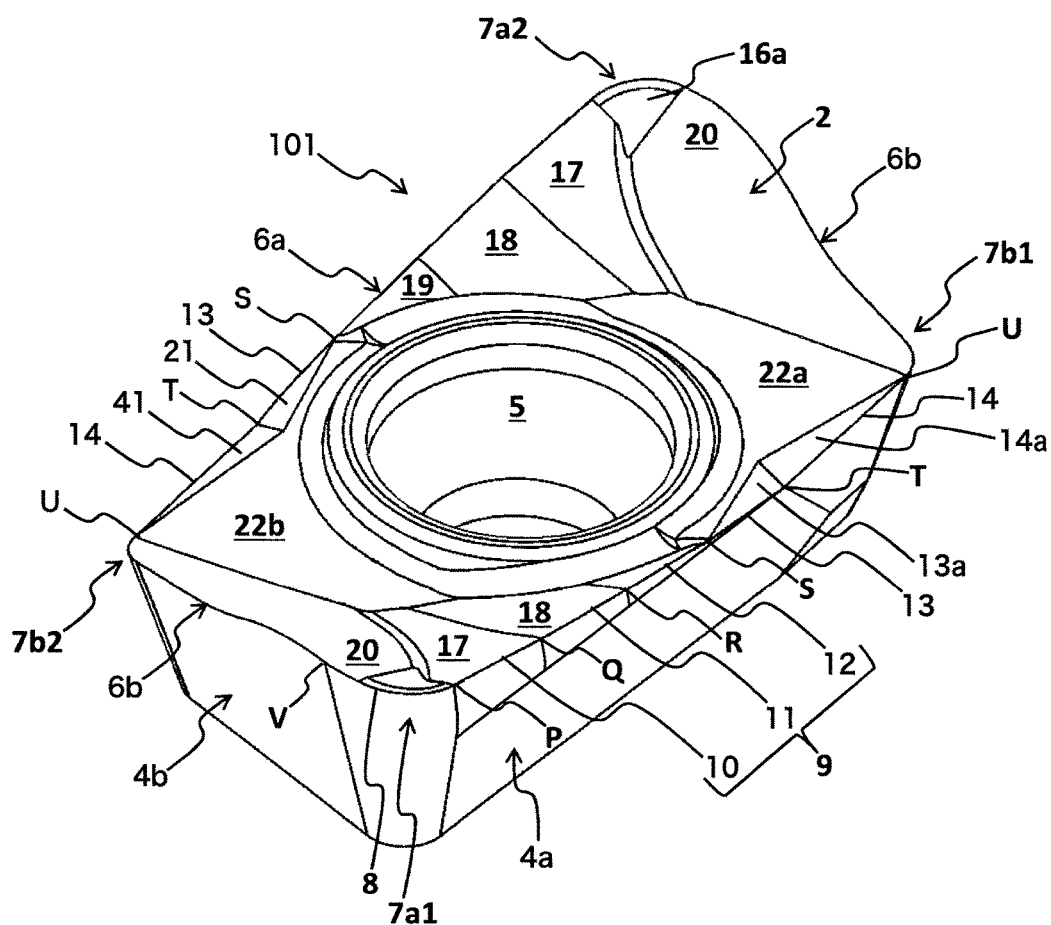
FIG. 15 is a perspective view showing an insert according to the third embodiment of the present invention.
Figure 16:
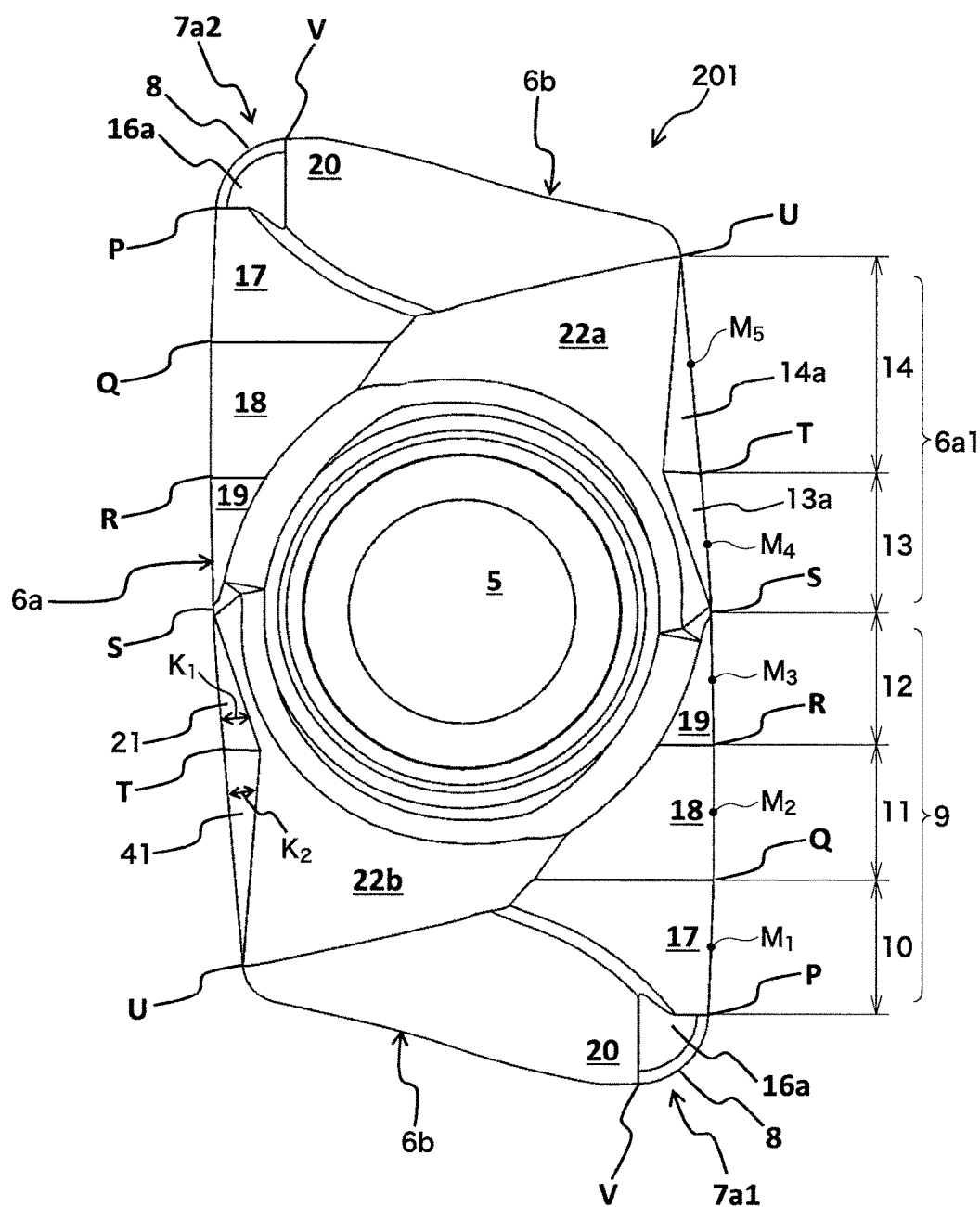
FIG. 16 is a plan view showing the insert according to the third embodiment of the present invention.
Figure 17:
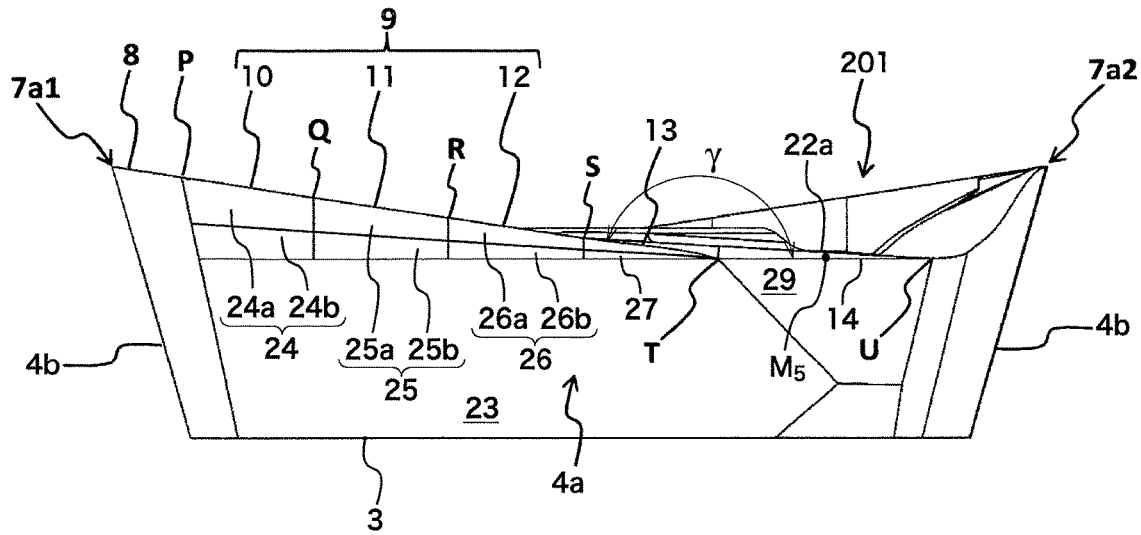
FIG. 17 is a side view showing the insert according to the third embodiment of the present invention.
Figure 18:
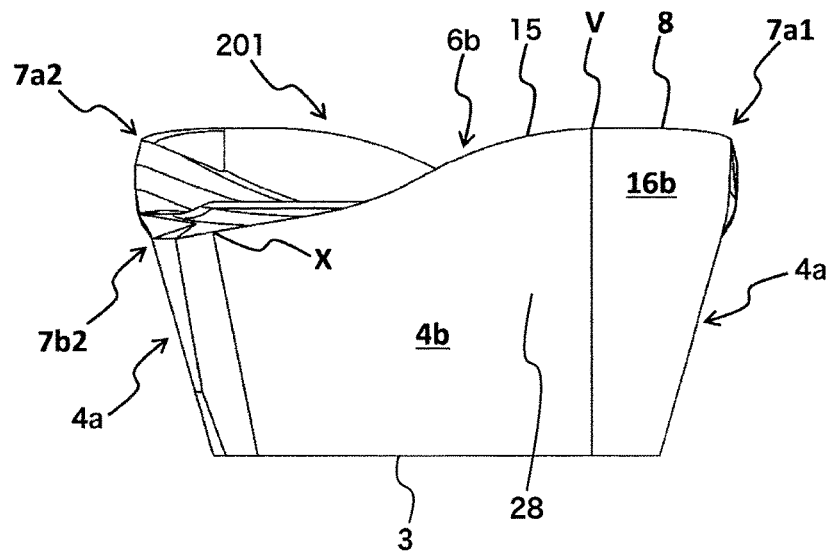
FIG. 18 is a front view showing the insert according to the third embodiment of the present invention.

In the second embodiment shown in FIGS. 12 and 13, the insert 101 has an inclined surface 21a higher on the side of the screw-receiving hole 5, which is formed in an upper surface portion between both ends S and T of the first connecting ridgeline portion 13, such that the crossing angle between the upper surface and the side surface at both ends S, T of the first connecting ridgeline portion 13 is more than 90°. A crossing angle $\theta_1$ (ridge angle) between the inclined surface 21a and side surface portion 27 (first side surface portion 27a) of the first connecting ridgeline portion 13 at the point S is larger than 90° as shown in FIG. 14. Specifically, the ridge angle $\theta_1$ is preferably $100°\leq\theta_1\leq 120°$, more preferably 105-115°. In the second embodiment, too, $\theta_2$ is slightly smaller than $\theta_1$, because the flank (side surface) is gradually inclined inward in a region from one corner portion 7a1 to the other corner portion 7b1. In the example shown in FIG. 14, β1 to β4 are the same as in FIG. 8, but $\theta_1$ is 110°, and $\theta_2$ is 108°. Because of a large ridge angle $\theta_1$, the first connecting ridgeline portion 13 is further strengthened near the point S, exhibiting increased resistance to chipping due to the biting of chips.

(C) Third Embodiment

FIGS. 15-18 show an insert 201 according to the third embodiment of the present invention. To increase the strength of the first and second connecting ridgeline portions 13, 14 extending from the end S, this insert 201 is characterized in that (a) the upper surface portion 22a is an inclined surface highest at the point S and lowest at the point U, and that (b) the upper surface portion 22a is provided with a notched surface contiguous to the first and second connecting ridgeline portions 13, 14. The upper surface portion 22a is inclined when viewed from side (FIG. 17), but in parallel with the bottom surface in a transverse direction in FIG. 16. Because the insert 201 in the third embodiment is the same as the insert 1 in the first embodiment in other points than the above points (a) and (b), only these points will be explained in detail below.

A notched surface contiguous to the first and second connecting ridgeline portions 13, 14 in the upper surface portion 22a comprises a notched surface portion 13a contiguous to the first connecting ridgeline portion 13, and a notched surface portion 14a contiguous to the second connecting ridgeline portion 14. The width K1 of the notched surface portion 13a is substantially 0 at the highest end S, continuously increasing toward the end T, and maximum at the end T. The width K1 of the notched surface portion 13a is equal to the width K2 of the notched surface portion 14a at the end T. The width K2 of the notched surface portion 14a continuously decreases from the end T toward the end U, and substantially 0 at the lowest end U.

Because the width K1 of the notched surface portion 13a is substantially 0 at the end S, the first connecting ridgeline portion 13 is thickest at the end S, thus having high strength. Accordingly, the main cutting edge 9 used for cutting a vertical wall of a difficult-to-cut material exhibits remarkably improved chipping resistance even when the biting of chips occurs. A wider notched surface is obtained by making the width K2 of the notched surface portion 14a equal to the width K1 of the notched surface portion 13a at the end T, suppressing the biting of chips.

When an angle (notch angle) γ between the first connecting ridgeline portion 13 and the second connecting ridgeline portion 14 when viewed from side is defined as a crossing angle of the straight line ST and the straight line TU, γ is preferably 160-176°, more preferably 165-171°.

Figure 19:
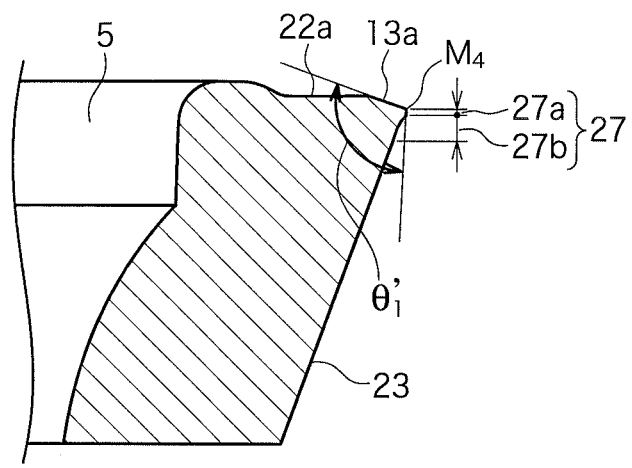
FIG. 19 is a partial cross-sectional view showing a ridge angle $\theta_1'$ of a first connecting ridgeline portion at a point $M_4$ in the insert according to the third embodiment of the present invention.
Figure 20:
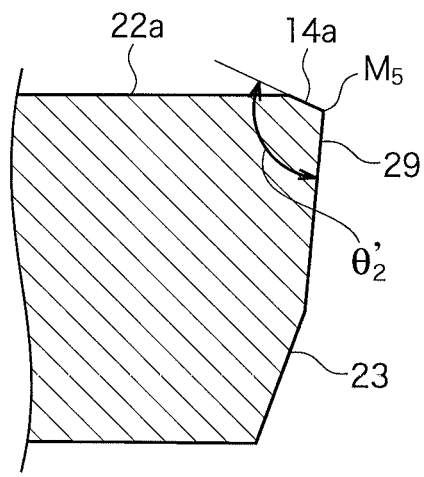
FIG. 20 is a partial cross-sectional view showing a ridge angle $\theta_2'$ of the first connecting ridgeline portion at a point $M_5$ in the insert according to the third embodiment of the present invention.
Figure 21:
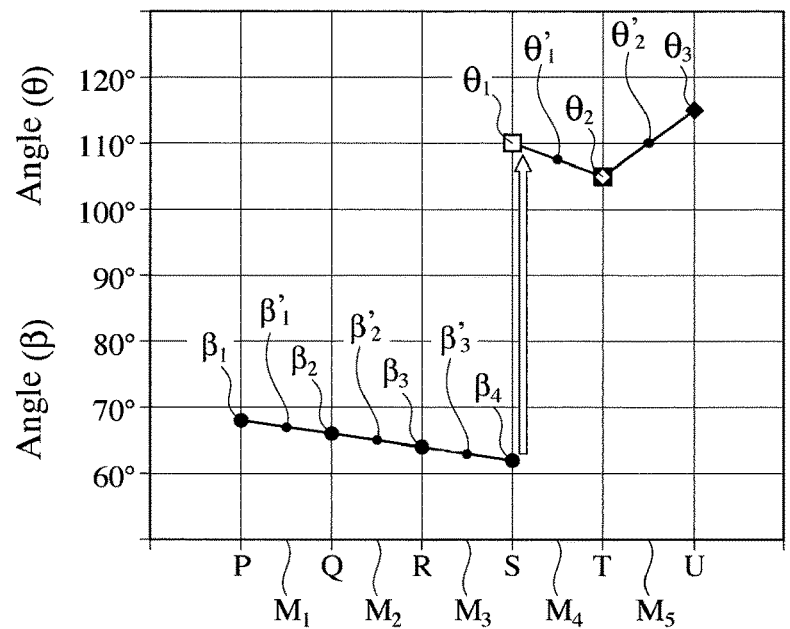
FIG. 21 is a graph showing the changes of $\beta_1$ to $\beta_4$ and $\theta_1$ to $\theta_3$ in an example of the inserts according to the third embodiment of the present invention.
Figure 22:
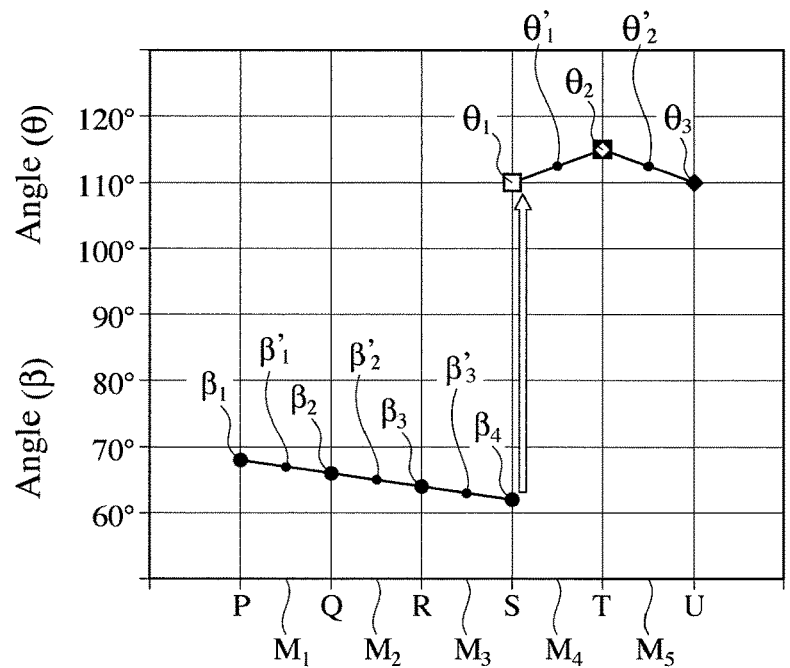
FIG. 22 is a graph showing the changes of $\beta_1$ to $\beta_4$ and $\theta_1$ to $\theta_3$ in another example of the inserts according to the third embodiment of the present invention.

As shown in FIGS. 19-22, a ridge angle $\theta_1$ between the notched surface portion 13a and side surface portion 27 of the first connecting ridgeline portion 13 at the point S preferably meets the relation of $\theta_1>\beta_1$. Also, a ridge angle $\theta_2$ between the notched surface portion 14a and side surface portion 29 of the second connecting ridgeline portion 14 at the point T preferably meets the relation of $\theta_2>\beta_1$. The relation of $\theta_1$ and $\theta_2$ may be $\theta_1>\theta_2$ as shown in FIG. 21, or $\theta_2>\theta_1$ as shown in FIG. 22. In the case of FIG. 21, $\theta_1$ is preferably 105-120°, and $\theta_2$ is preferably 100-110°. In the case of FIG. 22, $\theta_1$ is preferably 105-120°, and $\theta_2$ is preferably 110-120°. Though not particularly restrictive, an angle $\theta_3$ between the notched surface portion 14a and side surface portion 29 of the second connecting ridgeline portion 14 at the point U may be in a range of 100-120°.

With the relation of $\theta_1>\beta_1$ met, the first connecting ridgeline portion 13 has high strength near the point S. Also, with the relation of $\theta_2>\beta_1$ met, the second connecting ridgeline portion 14 has high strength near the point T. With the relations of $\theta_1>\beta_1$ and $\theta_2>\beta_1$ met, the first and second connecting ridgeline portions 13, 14 are entirely made stronger, preventing breakage, etc.

As shown in FIGS. 19 and 20, the ridge angles $\theta_1$, $\theta_2$ of the first and second connecting ridgeline portions 13, 14 change depending on the lateral inclination angles of the notched surface portion 13a, 14a. Accordingly, the lateral inclination angles of the notched surface portions 13a, 14a may be determined depending on the desired ridge angles $\theta_1$, $\theta_2$. Because the insert 1 in any embodiment of the present invention is a two-corner type as shown above, when any of a corner cutting edge 8, a main cutting edge 9 and an auxiliary cutting edge 15 on both sides thereof in the insert 1 fixed to the insert seat 33 is worn by cutting, the insert 1 can be detached from the insert seat 33, rotated by 180°, and then attached to the insert seat 33 again to use an unused corner cutting edge 8, an unused main cutting edge 9 and an unused auxiliary cutting edge 15 on both sides thereof.

[2] Indexable Rotary Cutting Tool

The indexable rotary cutting tool to which the inserts 1 of the present invention are detachably attached may have any cutting edge diameter, which may be, for example, 8 mm or more. As shown in FIG. 23, a tool body 31 constituting the indexable rotary cutting tool comprises a shank portion 32 and pluralities of insert seats 33, and each insert seat 33 has a flat seating surface 34 coming into close contact with the lower surface 3 of the insert 1, a screw hole 35 formed in the seating surface 34 with which a cramping screw 38 for fixing the insert 1 is threadably engageable (see FIG. 24), a long-side constraining wall surface 36 abutting the long side surface of the insert 1, and a short-side constraining wall surface 37 abutting the short side surface of the insert 1. The symbol O shown in FIG. 23 is a rotation center axis of the indexable rotary cutting tool 30.

Figure 24:
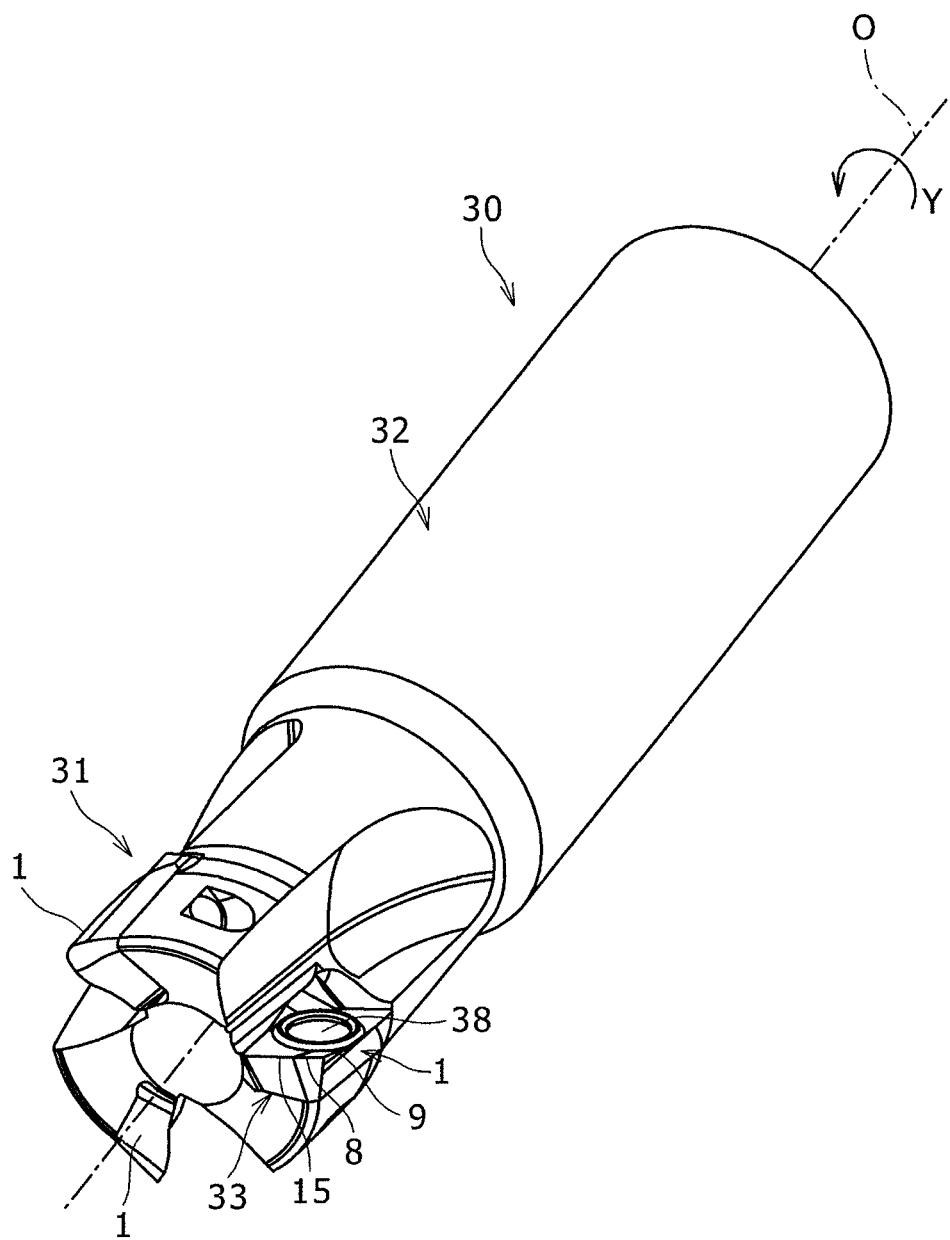
FIG. 24 is a perspective view showing an indexable rotary cutting tool comprising the inserts of the present invention attached to the tool body of FIG. 23.
Figure 25:
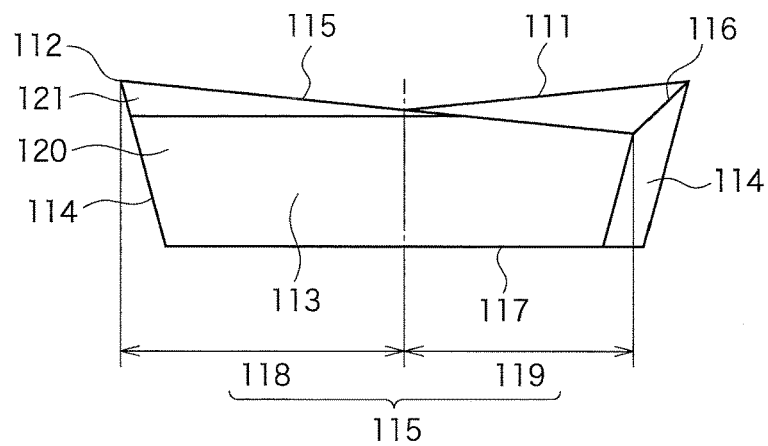
FIG. 25 is a side view showing the insert described in JP 2003-260607 A.
Figure 26:
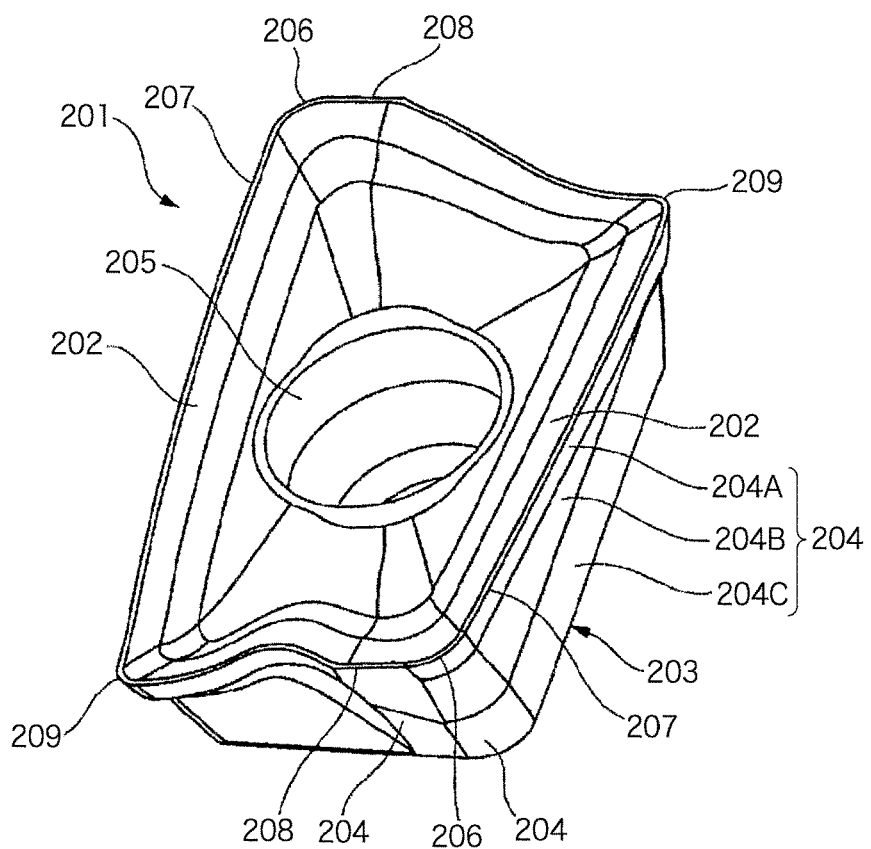
FIG. 26 is a perspective view showing the insert described in JP 2008-213078 A.
Figure 27:
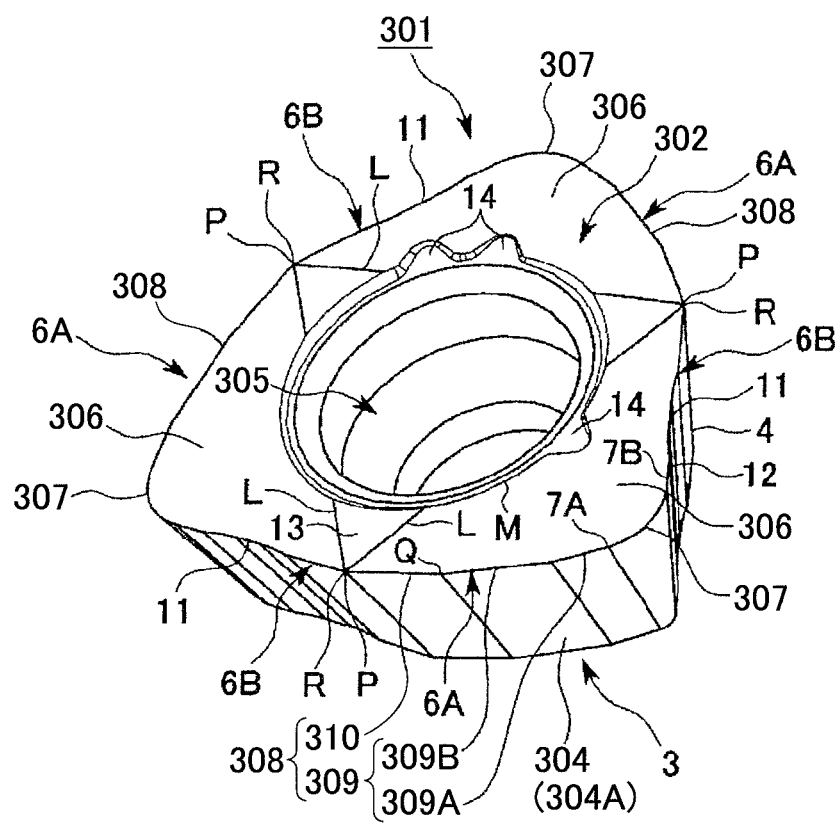
FIG. 27 is a perspective view showing the insert described in JP 2006-75913 A.

FIG. 24 shows an indexable rotary cutting tool 30, in which the inserts 1 are fixed to the tool body 31 shown in FIG. 23. The symbol Y shows a rotation direction of the indexable rotary cutting tool 30 attached to a machine. In the indexable rotary cutting tool 30, the main cutting edge 9 of the insert 1 is positioned on a periphery of the tool body 31, while the auxiliary cutting edge 15 is positioned on a tip end surface of the tool body 31.

Though the indexable rotary cutting tool 30 shown in FIG. 24 comprises three insert seats 33, the number of insert seats 33 is not restricted, but may be 2-5 depending on the edge diameter of the tool body 31. In the indexable rotary cutting tool 30, each insert 1 having as large an axial rake angle as about 18±3° can reduce the cutting resistance of a difficult-to-cut material.

When the insert 1 of the present invention is fixed to the insert seat 33 by a cramping screw 38, the second straight cutting edge 11 among three straight cutting edges 10, 11, 12 constituting the main cutting edge 9 is preferably in parallel with the rotation axis O, and located at the outermost periphery of the tool body 31. To this end, the shape and size of each portion of the insert 1 is properly adjusted.

When a vertical wall of a work is cut by the indexable rotary cutting tool 30, the second straight cutting edge 11 can be used as a main cutting edge, resulting in a good cut surface of the work with reduced cutting resistance. Further, with the main cutting edge 9 constituted by three straight cutting edges 10, 11, 12 connected in a bent-line shape, chips generated by cutting are divided and well discharged.

Whether the insert 1 attached to the insert seat 33 is accurately positioned or not is usually confirmed by an image-detecting apparatus, etc., but it is easy in the indexable rotary cutting tool of the present invention 30, because the second straight cutting edge 11 is in parallel with the rotation axis O. Because the second straight cutting edge 11 is in parallel with the rotation axis O, the operation of the indexable rotary cutting tool 30 attached to an NC machine is easily controlled with a simple NC program.

EFFECTS OF THE INVENTION

Because the insert of the present invention comprises a main cutting edge constituted by the first to third straight cutting edges connected in a bent-line shape, the second straight cutting edge being located outermost when viewed from above, the cutting edge angle $\beta 1$ between the rake face and flank of the first straight cutting edge, the cutting edge angle $\beta 2$ between the rake face and flank of the second straight cutting edge, and the cutting edge angle $\beta 3$ between the rake face and flank of the third straight the cutting edge meeting the relation of $\beta 1 > \beta 2 > \beta 3$, the main cutting edge has high strength even when cutting resistance is made smaller, enabling the high-quality cutting of a vertical wall of a difficult-to-cut material work generating a large cutting load. Also, the bent-line-shaped main cutting edge can provide short contact length with a work, suppressing heat from being transmitted to the insert, thereby achieving a long life.

With the angle $\theta_1$ between the upper surface and the side surface contiguous to the first connecting ridgeline portion larger than the maximum cutting edge angle $\beta_1$ of the main cutting edge, strength is increased near the connecting point S of the main cutting edge and the first connecting ridgeline portion, resulting in improved chipping resistance.

With the length of the main cutting edge as small as ⅓-¾ of the entire length A of the long-side ridgeline, cutting resistance applied to the main cutting edge can be reduced, and the transmission of heat to the insert can be suppressed.

With notched surfaces formed in the upper surface contiguous to the first and second connecting ridgeline portions, the width of each notched surface continuously increasing from the end S to the connecting point T and continuously decreasing from the connecting point T to the end U, such that it is substantially 0 at the end S of the first connecting ridgeline portion and at the end U of the second connecting ridgeline portion, and maximum at the connecting point T of the first and second connecting ridgeline portions, strength is further increased near the connecting point S of the main cutting edge and the first connecting ridgeline portion, resulting in further improved chipping resistance.

DESCRIPTION OF SYMBOLS 1, 101: Insert
2: Upper surface
3: Lower surface
4a: Long side surface
4b: Short side surface
5: Screw-receiving hole
6: Ridgeline
6a: Long-side ridgeline
6a1: Long-side ridgeline portion having no cutting edge
6b: Short-side ridgeline
6b1: Short-side ridgeline portion having no cutting edge
7a1, 7a2, 7b1, 7b2: Corner portion
8: Corner cutting edge
9: Main cutting edge
10: First straight cutting edge
11: Second straight cutting edge
12: Third straight cutting edge
13: first connecting ridgeline portion
13a: Notched surface portion contiguous to first connecting ridgeline portion
14: Second connecting ridgeline portion
14a: Notched surface portion contiguous to second connecting ridgeline portion
15: Auxiliary cutting edge
16a: Rake face of corner cutting edge
16b: Flank of corner cutting edge
17: Rake face of first straight cutting edge
18: Rake face of second straight cutting edge

19: Rake face of third straight cutting edge
20: Rake face of auxiliary cutting edge
20a: Flank of auxiliary cutting edge
21: Upper surface portion contiguous to first connecting ridgeline portion
22a, 22b: Flat upper surface portion
23: Flat constraining surface
24: Flank of first straight cutting edge
24a: First flank of first straight cutting edge
24b: Second flank of first straight cutting edge
25: Flank of second straight cutting edge
25a: First flank of second straight cutting edge
25b: Second flank of second straight cutting edge
26: Flank of third straight cutting edge
26a: First flank of third straight cutting edge
26b: Second flank of third straight cutting edge
27: Side surface portion contiguous to first connecting ridgeline portion
27a: First flank of first connecting ridgeline portion
27b: Second flank of first connecting ridgeline portion
29: Side surface portion contiguous to second connecting ridgeline portion
30: Indexable rotary cutting tool
31: Tool body
32: Shank portion
33: Insert seat
34: Seating surface
35: Screw hole
36: Long-side constraining wall surface
37: Short-side constraining wall surface
38: cramping screw
A: Length of entire long-side ridgeline
$A_1$: length of main cutting edge
B: Length of entire short-side ridgeline
$C_0$: Center of screw-receiving hole
$H_3, H_4, H_5$: Straight lines (vertical lines) perpendicular to lower
  surface of insert
$K_1$: Width of notched surface contiguous to first connecting ridgeline portion
$K_2$: Width of notched surface contiguous to second connecting ridgeline portion
$L_1$: Length of first straight cutting edge
$L_2$: Length of second straight cutting edge
$L_3$: Length of third straight cutting edge
$L_4$: Length of first connecting ridgeline portion
$L_5$: Length of auxiliary cutting edge
O: Rotation axis center of indexable rotary cutting tool
$O_1$: Circle center of first arcuate connecting ridgeline portion
P, Q, R, S, T, U, V, W, X: Ends of straight cutting edges and connecting ridgeline portions (connecting points)
Y: Rotation direction of indexable rotary cutting tool
$r_1$: Radius of circle of first connecting ridgeline portion
$r_2$: Radius of circle at end T
$\alpha_3$: Crossing angle (inclination angle) between third straight cutting edge and vertical line $H_3$ at end R
$\alpha_4$: Crossing angle (inclination angle) between fourth straight cutting edge and vertical line $H_4$ at end S
$\beta_1$: Cutting edge angle of first straight cutting edge at point P
$\beta_2$: Cutting edge angle of second straight cutting edge at point Q
$\beta_3$: Cutting edge angle of third straight cutting edge at point R
$\beta_4$: Cutting edge angle of third straight cutting edge at point S
$\delta_1$: Crossing angle (screw-receiving hole side) between first straight cutting edge and second straight cutting edge
$\delta_2$: Crossing angle (screw-receiving hole side) between second straight cutting edge and third straight cutting edge
$\delta_3$: Crossing angle between first straight cutting edge and straight line $H_1'$
$\delta_4$: Crossing angle (screw-receiving hole side) between third straight cutting edge and first connecting ridgeline portion
$\delta_5$: Crossing angle (screw-receiving hole side) between first connecting ridgeline portion and second connecting ridgeline portion
$\theta_1$: Ridge angle of first connecting ridgeline portion at point S
$\theta_2$: Ridge angle of second connecting ridgeline portion at point T
$\theta_3$: Ridge angle of second connecting ridgeline portion at point U

What is claimed is:

1. An insert comprising substantially parallelogramatic upper and lower surfaces, a side surface connecting said upper surface and said lower surface, and a screw-receiving hole penetrating from said upper surface to said lower surface;
   a pair of corner portions of said upper surface having corner cutting edges;
   part of a long-side ridgeline and a short-side ridgeline adjacent to said corner cutting edge having a main cutting edge and an auxiliary cutting edge both inclined downward;
   said upper surface having rake faces for said main cutting edge and said auxiliary cutting edge;
   said side surface having flanks for said main cutting edge and said auxiliary cutting edge;
   said main cutting edge being constituted by first to third straight cutting edges;
   said first to third straight cutting edges being connected in a bent-line shape with inward obtuse crossing angles when viewed from above, such that said second straight cutting edge is positioned outermost;
   a cutting edge angle $\beta_1$ between the rake face and flank of said first straight cutting edge, a cutting edge angle $\beta_2$ between the rake face and flank of said second straight cutting edge, and a cutting edge angle $\beta_3$ between the rake face and flank of said third straight cutting edge meeting the relation of $\beta_1 > \beta_2 > \beta_3$;
   said long-side ridgeline having first and second cutting-edge-free connecting ridgeline portions connected to said third straight cutting edge; and
   said first connecting ridgeline portion being connected to said third straight cutting edge with an inward obtuse angle when viewed from above.

2. The insert according to claim 1, wherein said main cutting edge being as long as ⅓-¾ of said long-side ridgeline.

3. The insert according to claim 1, wherein the length $L_1$ of said first straight cutting edge and the length $L_2$ of said second straight cutting edge meet the relation of $L_1 \leq L_2$.

4. The insert according to claim 1, wherein an angle $\theta_1$ between the upper and side surfaces of said first connecting ridgeline portion meets the relation of $\theta_1 > \beta_1$.

5. The insert according to claim 4, wherein an angle $\theta_2$ between a notched surface and a side surface contiguous to said second connecting ridgeline portion meet the relation of $\theta_2 > \beta_1$.

6. The insert according to claim 1, wherein said first connecting ridgeline portion is in the form of an upward projecting gentle curve, and smoothly connected to the third straight cutting edge at a point S when viewed from side, a crossing angle $\alpha_3$ of said second straight cutting edge to a vertical line at a point R connected to said third straight cutting edge, and a crossing angle $\alpha_4$ of said first connecting ridgeline portion to a vertical line at a point S connected to said third straight cutting edge meeting the relation of $\alpha_3 < \alpha_4 \leq 90°$.

7. The insert according to claim 1, wherein an inclined surface higher on the side of said screw-receiving hole is formed in an upper surface portion between both ends of said first connecting ridgeline portion, such that a crossing angle of the upper surface to the side surface at both ends of said first connecting ridgeline portion is more than 90°.

8. The insert according to claim 1, wherein
    said upper surface is provided with an inclined surface extending from said end S to an end U of said second connecting ridgeline portion, such that the inclined surface is highest at an end S of said first connecting ridgeline portion when viewed from side;
    said inclined surface is provided with a notched surface contiguous to said first and second connecting ridgeline portions; and
    the width of said notched surface is substantially 0 at said ends S and U, and continuously increases in a region from said end S to said connecting point T and continuously decreases in a region from said connecting point T to said end U, such that it is maximum at the connecting point T of said first and second connecting ridgeline portions.

9. The insert according to claim 8, wherein an angle $\gamma$ of said first connecting ridgeline portion to said second connecting ridgeline portion when viewed from side (defined as a crossing angle of a straight line ST to a straight line TU) is 160-176°.

10. An indexable rotary cutting tool comprising a plurality of insert seats and a plurality of inserts as recited in claim 1, each insert being detachably fixed to each insert seat by a clamping screw, said second straight cutting edge being located at the outermost peripheral position, and in parallel with the rotation axis O.

\* \* \* \* \*